(12) United States Patent
Oda et al.

(10) Patent No.: US 6,410,649 B1
(45) Date of Patent: Jun. 25, 2002

(54) RESIN COMPOSITION

(75) Inventors: Takeshi Oda; Shigeru Suzuki; Toru Arai; Akio Okamoto; Masataka Nakajima, all of Machida; Hideki Toya, Ichihara, all of (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/646,771

(22) PCT Filed: Mar. 19, 1999

(86) PCT No.: PCT/JP99/01412

§ 371 (c)(1),
(2), (4) Date: Sep. 22, 2000

(87) PCT Pub. No.: WO99/48972

PCT Pub. Date: Sep. 30, 1999

(30) Foreign Application Priority Data

| Mar. 23, 1998 | (JP) | 10-072940 |
| Mar. 23, 1998 | (JP) | 10-072941 |
| Mar. 23, 1998 | (JP) | 10-072942 |
| Mar. 23, 1998 | (JP) | 10-074397 |
| Oct. 15, 1998 | (JP) | 10-293352 |
| Oct. 15, 1998 | (JP) | 10-293353 |

(51) Int. Cl.[7] .................... C08L 23/00; C08L 23/36; C08L 25/00; C08L 25/18; C08L 25/02
(52) U.S. Cl. ............... 525/191; 525/216; 525/232; 525/238; 525/240; 525/241; 525/242; 526/319; 526/335; 526/336; 526/340; 526/346; 526/347; 526/348; 526/943
(58) Field of Search ................ 525/191, 216, 525/232, 238, 240, 241, 242; 526/319, 335, 336, 340, 346, 347, 348, 943

(56) References Cited

U.S. PATENT DOCUMENTS 5,460,818 A 10/1995 Park et al.
6,087,447 A * 7/2000 Stevens et al. ............ 525/211
6,166,145 A * 12/2000 Guest et al. ................ 525/241
6,248,850 B1 * 6/2001 Arai ........................... 526/347

FOREIGN PATENT DOCUMENTS

| DE | 197 11 339 | 10/1997 |
| JP | 1-113447 | 5/1989 |
| JP | 10-245457 | 9/1998 |
| JP | 10-273544 | 10/1998 |
| WO | WO 95/32095 | 11/1995 |
| WO | WO 98/10015 | 3/1998 |
| WO | WO 98/10017 | 3/1998 |

OTHER PUBLICATIONS

T. Arai, et al., Macromol. Rapid Commun., vol. 19, pp. 327–331, "Stereoregular and Bernoullian Copolymerization of Styrene and Ethylene by Bridged Metallocene Catalysts," 1998.

Patent Abstracts of Japan, vol. 1998, No. 04, Mar. 31, 1993, JP 09 309925, Dec. 2, 1997.

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

A resin composition characterized by comprising from 5 to 95 wt % of an aromatic vinyl compound/olefin random copolymer (A) which has an aromatic vinyl compound content of from 1 to 99 mol % and has a head-to-tail chain structure composed of two or more aromatic vinyl compound units, and from 95 to 5 wt % of an α-olefin type polymer (B) and/or an aromatic vinyl compound type polymer (C) (provided that it is neither a medical material nor a medical device), which contains substantially no chlorine and is excellent in the impact resistance, moldability, weather resistance and chemical resistance and which is useful for an injection molded product, an extrusion molded product, a film, a sheet, etc. Further, it provides an excellent damping material.

17 Claims, 1 Drawing Sheet

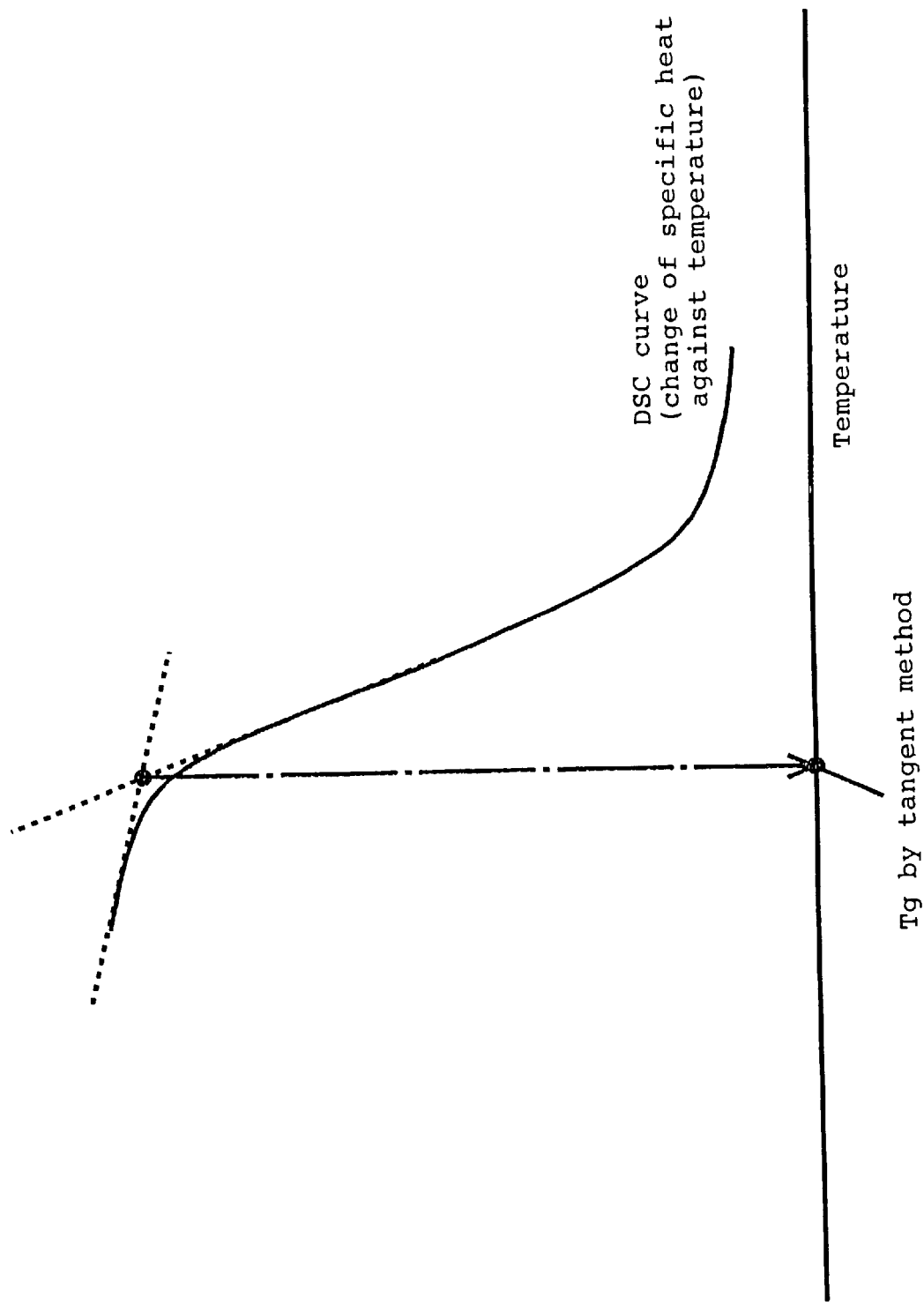

RESIN COMPOSITION

TECHNICAL FIELD

The present invention relates to a resin composition which is excellent in the impact resistance, moldability, weather resistance and chemical resistance and which is useful for an injection molded product, an extrusion molded product, a film, a sheet, etc., its molded product and a damping material made of the resin composition.

BACKGROUND ART

A polyolefin such as polyethylene or polypropylene is a typical general purpose plastic and has been used in a large amount for household products. For example, polyethylene or polypropylene is excellent in e.g. mechanical strength, moldability, heat resistance and chemical resistance and thus is used in various fields as a general purpose resin for e.g. films or containers. Further, in recent years, high performance polyolefin has become obtainable by an improvement in the polymerization technology for polyolefins, and it has been attempted to use it in a field where an engineering plastic has heretofore been used. However, its impact resistance is inadequate, and it has been difficult to employ it as an automobile part material such as a bumper or an instrument panel, or as a housing part material for a household product such as a refrigerator or a washing machine.

In the field of transparent soft resins, a so-called soft vinyl chloride resin is widely used. However, as it contains chlorine, an environmental load resulting from incineration has become problematic. Accordingly, a substitute material for such a vinyl chloride resin is desired.

On the other hand, an aromatic vinyl compound type resin such as a styrene type resin or a rubber-reinforced styrene type resin is a material excellent in the dimensional stability and rigidity, but has a drawback that it is inferior in the mechanical property, particularly in toughness.

For the purpose of overcoming such a drawback, a method is known in which an olefin type elastomer such as ethylene/isobutene is, for example, incorporated to a polyolefin. However, there will be a drawback that the surface hardness tends to decrease, and the surface tends to be susceptible to scratching. A resin composition with an ethylene/α-olefin copolymer has a drawback such that it is inferior in the transparency.

For an aromatic vinyl compound type resin, it is common to employ a method of dispersing a rubber phase having elasticity non-continuously in a hard resin for the purpose of improving the impact resistance. At that time, it is common to add e.g. a styrene/butadiene random copolymer, a styrene/butadiene block copolymer, a styrene/isoprene block copolymer or a hydrogenated styrene/butadiene block copolymer. However, there is a drawback such that the resin is likely to undergo thermal deterioration during molding due to the double bond of butadiene or isoprene of the copolymer, or in the case of a styrene/butadiene block copolymer or the like, the styrene blocks have no solvent resistance, and the resin tends to be inferior in the solvent resistance. Further, the hydrogenated styrene/butadiene block copolymer has a problem that the rigidity of the resin composition tends to substantially decrease.

From such a background, a polymer composition is desired wherein different properties, such as high rigidity and glass transition temperature of an aromatic vinyl compound type polymer, flexibility and low glass transition point of an olefin polymer, and a high solvent resistance attributable to a crystal structure, are well balanced. However, heretofore, a composition obtained by blending an aromatic vinyl compound type polymer and an olefin type polymer, has not provided the desired physical properties, since compatibility of these resins is poor. Therefore, various compatibilizing agents have been studied. As a compatibilizing agent, a block copolymer of an aromatic vinyl compound with a diene compound or SEBS having such a copolymer hydrogenated, has been, for example, employed. (J. Polym. Sci., Polym. Letters, 19, 79 (1981), JP-A-56-38338, U.S. Pat. No. 4,020,025, etc.) Further, a case wherein styrene butadiene rubber (SBR) or hydrogenated SBR is employed as a compatibilizing agent, has also been reported.

Recently, as a copolymer made of an aromatic vinyl compound monomer and an olefin type monomer, a styrene/ethylene solid random copolymer is disclosed in JP-A-7-70223 or U.S. Pat. No. 5,703,187. Such a pseudorandom copolymer is a copolymer obtained by means of a geometrically constrained catalyst (CGCT catalyst). According to JP-A-6-49132, it is superior to a styrene type block copolymer in the compatibility with other resins. However, the pseudorandom copolymer contains no head-to-tail chain structure of aromatic vinyl compound units, and accordingly, the compatibility tends to be limited. Further, no significant stereoregularity is observed, and it is a non-crystalline resin in a region where the styrene content is at least from 15 to 20 mol %, whereby the mechanical property such as breaking strength is not sufficient, and the solvent resistance is also not sufficient.

WO98/10015 discloses a composition comprising an intercopolymer of an aromatic vinylidene monomer with an α-olefin monomer and a polyolefin, and WO98/10014 discloses a composition comprising an intercopolymer of an aromatic vinylidene monomer with an α-olefin monomer and an interpolymer of an aromatic vinylidene monomer or the like. However, Examples of these specifications are directed to pseudorandom copolymers by means of the above-mentioned CGCT catalysts.

Further, JP-A-10-60194 discloses a composition comprising an ethylene/vinylidene aromatic monomer copolymer and a propylene type resin. However, in Examples, the CGCT catalyst is likewise employed.

DISCLOSURE OF THE INVENTION

The present inventors have conducted an extensive study on an aromatic vinyl compound/olefin random copolymer having a true random structure i.e. not a pseudorandom structure and on its physical properties and as a result, have found a method for its production, and they have found that the random copolymer is one provided with the properties of an aromatic vinyl compound type polymer and an olefin type polymer in good balance and further have found a resin composition comprising the random copolymer having overcome the above-mentioned drawbacks of a conventional aromatic vinyl compound type polymer or an olefin type polymer, whereby the present invention has been completed.

Namely, the present invention relates to a resin composition characterized by comprising from 5 to 95 wt % of an aromatic vinyl compound/olefin random copolymer (A) which has an aromatic vinyl compound content of from 1 to 99 mol % and has a head-to-tail chain structure composed of two or more aromatic vinyl compound units, and from 95 to 5 wt % of an α-olefin type polymer (B) and/or an aromatic vinyl compound type polymer (C); a molded product thereof and a damping product thereof.

Now, the present invention will be described in detail.

The aromatic vinyl compound/olefin random copolymer (A) constituting the resin composition of the present invention is such an aromatic vinyl compound/olefin random copolymer (A) having an aromatic vinyl content of from 1 to 99 mol % and has a head-to-tail chain structure composed of two or more aromatic vinyl compound units.

It will be described with reference to a styrene-ethylene random copolymer which is suitably used as the random copolymer (A).

The aromatic vinyl compound/olefin random copolymer constituting the present invention has main peaks at the following positions by $^{13}$C-NMR using TMS as standard.

Namely, it shows peaks attributable to main chain methylene and main chain methine carbon in the vicinity of from 24 to 25 ppm, in the vicinity of 27 ppm, in the vicinity of 30 ppm, in the vicinity of from 34 to 37 ppm, in the vicinity of from 40 to 41 ppm and in the vicinity of from 42 to 46 ppm, and peaks attributable to five carbons not bonded to the polymer main chain in the phenyl group in the vicinity of 126 ppm and in the vicinity of 128 ppm, and a peak attributable to one carbon bonded to the polymer main chain in the phenyl group in the vicinity of 146 ppm.

The styrene/ethylene random copolymer to be used in the present invention is a styrene/ethylene random copolymer having a styrene content of from 1 to 99 mol %, preferably from 10 to 90 mol % and is such a styrene/ethylene random copolymer (A2) wherein the alternating structure index λ of styrene units and ethylene units represented by the following Formula (i) is larger than 1 and smaller than 70, preferably larger than 5 and smaller than 70:

$$\lambda = A_3/A_2 \times 100 \qquad (i)$$

where $A_3$ is the sum of peak areas attributable to three carbons a, b and c of a styrene/ethylene alternating structure represented by the following formula K2, as obtained by the $^{13}$C-NMR measurement, and $A_2$ is the sum of peak areas attributable to the main chain methylene and the main chain methine carbon, as observed within a range of from 0 to 50 ppm by $^{13}$C-NMR using TMS as standard:

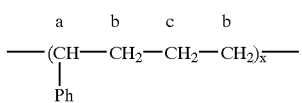

K3

(wherein Ph is a phenyl group, and x is an integer of at least 2 representing a number of repeating units).

In a styrene/ethylene random copolymer which is preferably employed in the present invention, the stereoregularity of phenyl groups in the styrene/ethylene alternating structure represented by the above formula K3 has an isotactic structure. Here, "has an isotactic structure" means a styrene/ethylene random copolymer (A3) wherein the isotactic diad index m (or a meso diad fraction) represented by the following Formula (ii), is larger than 0.5, and preferably means such a random copolymer wherein m is preferably larger than 0.75, more preferably at least 0.95.

Here, Ar is a peak area attributable to the r structure of a methylene carbon peak appearing in the vicinity of 25 ppm, and Am is a peak area attributable to the m structure:

$$m = Am/(Ar+Am) \qquad (ii)$$

The positions of the peaks may sometimes shift more or less depending upon the measuring conditions or the solvent used.

For example, when chloroform-d is used as a solvent, and TMS is used as standard, the peak attributable to the r structure appears in the vicinity of from 25.4 to 25.5 ppm, and the peak attributable to the m structure appears in the vicinity of from 25.2 to 25.3 ppm.

Further, when 1,1,2,2-tetrachloroethane-d2 is used as a solvent, and the center peak (shift value of 73.89 ppm from TMS standard) of the triplet of the 1,1,2,2-tetrachloroethane-d2 is used as standard, the peak attributable to the r structure appears in the vicinity of from 25.3 to 25.4 ppm, and the peak attributable to the m structure appears in the vicinity of from 25.1 to 25.2 ppm.

Here, the m structure represents a meso diad structure, and the r structure represents a racemic diad structure.

In the styrene-ethylene random copolymer to be used in the present invention, a peak attributable to the r structure of the alternating structure of ethylene and styrene is not substantially observed.

Further, in the styrene/ethylene random copolymer which is preferably used in the present invention, the stereoregularity of phenyl groups in the chain structure of styrene units, is isotactic. The stereoregularity of phenyl groups in the chain structure of styrene units being isotactic means a styrene/ethylene random copolymer (A4) wherein the isotactic diad index ms (or a meso diad fraction) represented by the following Formula (iii), is larger than 0.5, and preferably means such a random copolymer wherein ms is preferably at least 0.7, more preferably at least 0.8:

$$ms = Am'/(Ar'+Am') \qquad (iii)$$

where Ar' is a peak area of methylene carbon attributable to the syndiotactic diad structure (r structure) by the $^{13}$C-NMR measurement, and Am' is a peak area of methylene carbon attributable to the isotactic diad structure (m structure).

The stereoregularity of the chain structure of styrene units is determined by the peak position of methylene carbon in the vicinity of from 43 to 44 ppm as observed by $^{13}$C-NMR and by the peak position of the main chain proton as observed by $^{1}$H-HMR.

With respect to the foregoing λ, m and ms, the details are disclosed in JP-A-9-309925.

According to U.S. Pat. No. 5,502,133, methylene carbon of an isotactic polystyrene chain structure appears in the vicinity of from 42.9 to 43.3 ppm, but methylene carbon of a syndiotactic polystyrene chain structure appears in the vicinity of from 44.0 to 44.7 ppm. The positions of the sharp peak of methylene carbon of the syndiotactic polystyrene and the broad peak at from 43 to 45 ppm of an atactic polystyrene are close to or overlap the positions of peaks with relatively low intensity of other carbon of the styrene/ethylene random copolymer to be used in the present invention. However, in the present invention, a strong methylene carbon peak is observed from 42.9 to 43.4 ppm, but no clear peak is observed in the vicinity of from 44.0 to 44.7.

The styrene/ethylene random copolymer to be used in the present invention is such a random copolymer containing a chain structure wherein styrene units are bonded head-to-tail, a chain structure wherein ethylene units are bonded to one another and a structure in which aromatic vinyl compound units and ethylene units are bonded. The proportions of these structures in the random copolymer vary depending upon the content of the styrene monomer during the polymerization or polymerization conditions such as the polymerization temperature.

As the styrene content decreases, the proportion of the chain structure in which styrene units are bonded head-to-tail, decreases. For example, in a case of the random copolymer wherein the styrene content is not higher than about 20 mol %, it is difficult to directly observe a peak attributable to the chain structure wherein styrene units are bonded head-to-tail, by the usual $^{13}$C-NMR measurement. However, it is evident that the chain structure in which aromatic vinyl compound units are bonded head-to-tail, is present in the copolymer, although the amount may be small, even if the styrene content is not higher than 20 mol %, since it is possible to produce a polystyrene having stereoregularity under high catalytic activity by homopolymerization of styrene by using the transition metal compound as described in the present invention or by the method as described in the present invention, i.e. it is essentially possible to form a chain structure in which styrene units are bonded head-to-tail, and since in the random copolymer, the proportion of the chain structure in which styrene units are bonded head-to-tail, continuously changes corresponding to the styrene content of from 20 to 99 mol % at least by the $^{13}$C-NMR method. It is possible to observe the chain structure wherein aromatic vinyl compound units are bonded head-to-tail, in the copolymer having a styrene content of not higher than 20 mol %, by such a means as the $^{13}$C-NMR analysis using a styrene monomer enriched with $^{13}$C.

The same applies to the chain structure of ethylene units.

The chain structure of a head-to-tail bond of styrene units contained in the styrene/ethylene random copolymer to be used in the present invention is a chain structure of at least two styrenes, preferably a chain structure of at least three styrenes, which can be represented by the following structure K4:

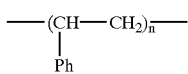

K4

(wherein n is an integer of at least 2 representing a number of repeating units, and Ph is a phenyl group).

On the other hand, in the conventional so-called pseudo random copolymer, no head-to-tail chain structure of styrene units can be found even in the vicinity of 50 mol % at which the styrene content is maximum. Further, even if homopolymerization of styrene is attempted by using a catalyst for the preparation of a pseudo random copolymer, no polymer is obtainable. Depending upon e.g. the polymerization condition, an extremely small amount of an atactic styrene homopolymer may sometimes be obtained. However, this is considered to have been formed by radical polymerization or cation polymerization by coexisting methylalumoxane or an alkylaluminum included therein.

The weight average molecular weight of the styrene/ethylene random copolymer to be used in the present invention is preferably at least 60,000, preferably at least 80,000, when the styrene content is at least 1 mol % and less than 20 mol %, and at least 30,000, preferably at least 40,000, when the styrene content is at least 20 mol % and at most 99 mol %.

Here, the weight average molecular weight is a molecular weight as calculated as polystyrene, obtained by GPC using standard polystyrene. To have such a practical high molecular weight as shown here, is a condition required particularly when an application as a compatibilizing agent or as a polymer composition is taken into consideration. The upper limit of the weight average molecular weight is not particularly limited, but it is preferably at most 3,000,000, more preferably at most 1,000,000. If the molecular weight exceeds 3,000,000, the melt viscosity increases, and it tends to be difficult to prepare a composition by e.g. a melt kneading method, and further, molding by a common molding method such as injection molding or extrusion molding tends to be difficult.

Further, the molecular weight distribution (Mw/Mn) is at most 6, preferably at most 4, particularly preferably at most 3. As the molecular weight distribution is small, and the homogeneity is high, the transparency is good. Particularly, it is a feature that in comparison with a copolymer obtainable by a CGCT catalyst, the composition distribution is small, and the homogeneity is high, whereby the transparency is high.

The styrene/ethylene random copolymer to be suitably used in the present invention is such that it has a highly stereoregular alternating structure of ethylene and styrene in combination with various structures such as ethylene chains having various lengths, inversion of styrene and head to tail chains of styrene having various lengths. Further, the proportion of the alternating structure can be variously changed by the styrene content in the random copolymer within a range of λ of the above formula for alternating structure index λ being more than 1 and less than 70. The stereoregular alternating structure is a crystallizable structure. Accordingly, the random copolymer can be made to have various properties in the form of a polymer having a crystalline, non-crystalline, or partially or microcrystalline structure, by controlling the styrene content or the crystallinity by a suitable method. The value λ being less than 70 is important in order to impart significant toughness and transparency to a crystalline polymer, or to obtain a partially crystalline polymer, or to obtain a non-crystalline polymer.

As compared with a conventional styrene/ethylene copolymer having no stereoregularity or no styrene chains, the styrene/ethylene random copolymer to be suitably used in the present invention is improved in various properties such as the initial tensile modulus, hardness, breaking strength and solvent resistance in various styrene content regions at various degrees of crystallinity and thus exhibits characteristic physical properties as a crystalline resin, a thermoplastic elastomer or a transparent soft resin.

Further, by changing the styrene content, the glass transition point can be changed within a wide range. Within a styrene content range of at least about 10 mol %, it has a high melting point (by DSC) as compared with the conventional styrene/ethylene pseudorandom copolymer having no stereoregularity or no styrene chains.

Further, as a means to increase the crystallinity, it is possible to adopt a means such as annealing, addition of a nucleating agent or alloying with a polymer having a low Tg (such as wax).

The foregoing description was made with reference to a styrene/ethylene random copolymer as an example. However, the foregoing description applies as it is to an aromatic vinyl compound/olefin random copolymer.

The aromatic vinyl compound to be used for the aromatic vinyl compound/olefin random copolymer (A) constituting the resin composition of the present invention may, for example, be styrene and various substituted styrenes (such as p-methylstyrene, m-methylstyrene, o-methylstyrene, o-t-butyl styrene, m-t-butyl styrene, p-t-butyl styrene, and α-methylstyrene, and may further be, for example, a compound having a plurality of vinyl groups in one molecule, such as divinyl benzene.

Industrially, it is preferred to use styrene, p-methylstyrene or α-methylstyrene, particularly preferably styrene. These aromatic vinyl compounds may be used in combination as a mixture of two or more of them.

Further, the olefin may, for example, be a $C_{2-20}$ α-olefin, such as ethylene, propylene, 1-butene, 1-hexene, 4-methyl- 1-pentene or 1-octene, or a cyclic olefin such as norbornene or norbornadiene. Among them, ethylene or propylene is preferred.

Further, especially in a preferred aromatic vinyl compound/ethylene copolymer, a $C_{3-20}$ α-olefin such as propylene, 1-butene, 1-hexene, 4-methyl-1-pentene or 1-octene, a cyclic olefin such as norbornene or norbornadiene and/or a diene such as butadiene or isoprene, may be incorporated as a third or fourth monomer component for the purpose of improving the physical properties, so long as the above-mentioned alternating structure index λ value and the stereoregularity index m value are within the ranges prescribed by the present invention.

Further, depending upon the polymerization conditions, etc., there may be a case where an atactic homopolymer resulting from thermal, radical or cationic polymerization of an aromatic vinyl compound, will be contained in a small amount. However, such an amount is not higher than 10 wt % of the entirety. Such a homopolymer can be removed by solvent extraction, but the product may be used as it contains such a homopolymer, unless there is any particular problem from the viewpoint of the physical properties.

Further, the resin composition of the present invention may be blended with a polymer other than the above described polymers, within a range not to impair the performance of the resin composition.

A method for producing the aromatic vinyl compound/olefin random copolymer (A) to be used in the present invention, is not particularly limited. However, it can be produced from an aromatic vinyl compound and an olefin by means of a catalyst comprising a transition metal compound represented by the following Formula K5 and a co-catalyst with a practically high productivity:

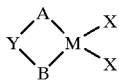

K5

In the above Formula, A and B are groups selected from an unsubstituted or substituted cyclopentaphenanthryl group (the following K6, K7), an unsubstituted or substituted benzindenyl group (K8 to K10), an unsubstituted or substituted cyclopentadienyl group, an unsubstituted or substituted indenyl group, or an unsubstituted or substituted fluorenyl group, provided that at least one of A and B is a group selected from an unsubstituted or substituted cyclopentaphenanthryl group, an unsubstituted or substituted benzindenyl group, or an unsubstituted or substituted indenyl group. Preferably, at least one of A and B is a group selected from an unsubstituted or substituted cyclopentaphenanthryl group, or an unsubstituted or substituted benzindenyl group.

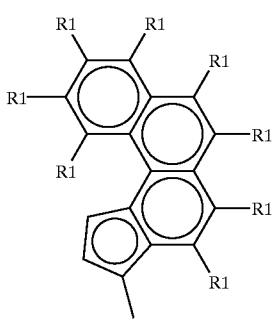

K6

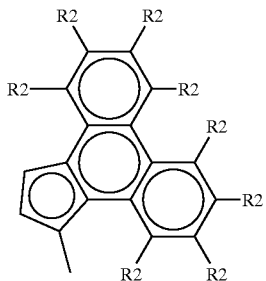

K7

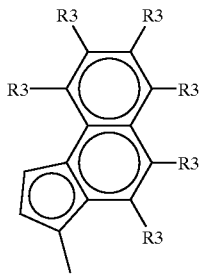

K8

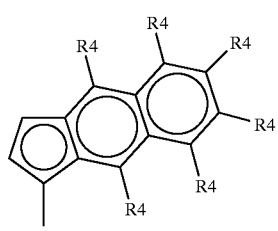

K9

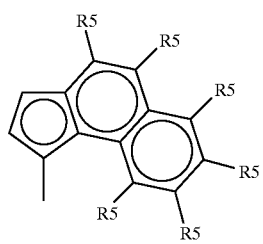

K10

(in the above Formulae K6 to K10, each of R1 to R8 is hydrogen, a $C_{1-20}$ alkyl group, a $C_{6-10}$ aryl group, a $C_{7-20}$ alkylaryl group, a halogen atom, an $OSiR_3$ group, a $SiR_3$ group or a $PR_2$ group (each R is a $C_{1-10}$ hydrocarbon group), and the plurality of R1, the plurality of R2, the plurality of R3, the plurality of R4 and the plurality of R5 may be the same or different from one another.) When each of A and B is an unsubstituted or substituted cyclopentaphenanthryl group, an unsubstituted or substituted benzindenyl group, or an unsubstituted or substituted indenyl group, the two may be the same or different.

Specifically, the unsubstituted cyclopentaphenanthryl group may, for example, be a 3-cyclopenta[c]phenanthryl group or a 1-cyclopenta[l]phenanthryl group.

The unsubstituted benzindenyl group may, for example, be 4, 5-benz-1-indenyl (another name: benzo(e)indenyl), 5,6-benz-1-indenyl or 6,7-benz-1-indenyl, and the substituted benzindenyl group may, for example, be α-acenaphtho-1-indenyl.

In the above Formula K5, Y is a methylene group, a silylene group or an ethylene group, which has bonds to A and B and further has hydrogen or a $C_{1-15}$ hydrocarbon group. The substituents may be the same or different from one another. Further, Y may have a cyclic structure such as a cyclohexylidene group or a cyclopentylidene group.

Preferably, Y is a substituted methylene group which has bonds to A and B and is substituted by hydrogen or a $C_{1-15}$ hydrocarbon group. The hydrocarbon group may, for example, be an alkyl group, an aryl group, a cycloalkyl group or a cycloaryl group. The substituents may be the same or different from one another.

Particularly preferably, Y is —$CH_2$—, —$CMe_2$—, —$CEt_2$—, —$CPh_2$—, a cyclohexylidene or a cyclopentylidene group. Here, Me represents a methyl group, Et an ethyl group, and Ph a phenyl group.

In the above Formula K5, X is hydrogen, halogen, a $C_{1-15}$ alkyl group, a $C_{6-10}$ aryl group, a $C_{8-12}$ alkylaryl group, a silyl group having a $C_{1-4}$ hydrocarbon substituent, a $C_{1-10}$ alkoxy group, or a dialkylamide group having a $C_{1-6}$ alkyl substituent. The halogen may, for example, be chlorine or bromine; the alkyl group may, for example, be a methyl group or an ethyl group; the aryl group may, for example, be a phenyl group; the alkylaryl group may, for example, be a benzyl group; the silyl group may, for example, be a trimethylsilyl group; the alkoxy group may, for example, be a methoxy group, an ethoxy group or an isopropoxy group; and the dialkylamide group may, for example, be a dimethylamide group.

Especially when X is dimethylamide, if the production method disclosed in WO95/32979 is applied to the production of the transition metal compound represented by the above Formula K5, there will be a merit that the compound can be produced very simply and at a low cost.

M is zirconium, hafnium or titanium, particularly preferably zirconium. With respect to a transition metal compound where a racemic-form and a meso-form are present, the racemic-form is preferably employed. However, a mixture of the racemic-form and the meso-form, or the meso-form, may be employed.

Specific examples of such a transition metal compound are disclosed in the above-mentioned JP-A-9-309925, and the following compounds may, for example, be mentioned.

For example, dimethylmethylene bis(1-indenyl) zirconium dichloride, dimethylmethylene bis(4,5-benz-1-indenyl)zirconium dichloride (another name: dimethylmethylenebis(benz-e-indenyl)zirconium dichloride), di-n-propylmethlenebis(4,5-benz-1-indenyl) zirconium dichloride, di-i-propylmethylenebis(4,5-benz-1-indenyl)zirconium dichloride, cyclohexylidenebis(4,5-benz-1-indenyl)zirconium dichloride, cyclopentylidenebis(4,5-benz-1-indenyl)zirconium dichloride, diphenylmethylenebis (4,5-benz-1-indenyl)zirconium dichloride, dimethylmethylene(cyclopentadienyl)(4,5-benz-1-indenyl) zirconium dichloride, dimethylmethylene(1-indenyl)(4,5-benz-1-indenyl)zirconium dichloride, dimethylmethylene(l-fluorenyl)(4,5-benz-1-indenyl)zirconium dichloride, dimethylmethylene(4-phenyl-1-indenyl)(4,5-benz-1-indenyl)zirconium dichloride, dimethylmethylene(4-naphthyl-1-indenyl)(4,5-benz-1-indenyl)zirconium dichloride, dimethylmethylenebis(5,6-benz-1-indenyl) zirconium dichloride, dimethylmethylene(5,6-benz-1-indenyl)(1-indenyl)zirconium dichloride, dimethylmethylenebis(4,7-benz-1-indenyl)zirconium dichloride, dimethylmethylene(6,7-benz-1-indenyl)(1-indenyl)zirconium dichloride, dimethylmethylenebis(4,5-naphtho-1-indenyl)zirconium dichloride, dimethylmethylenebis(α-acetonaphtho-1-indenyl) zirconium dichloride, dimethylmethylenebis(3-cyclopenta (c)phenanthryl)zirconium dichloride, dimethylmethylene(3-cyclopenta(c)phenanthryl)(1-indenyl)zirconium dichloride, dimethylmethylenebis(1-cyclopenta(1)phenanthryl) zirconium dichloride, dimethylmethylene(1-cyclopenta(1) phenanthryl)(1-indenyl)zirconium dichloride, and dimethylmethylenebis(4,5-benz-1-indenyl)zirconium bis (dimethylamide), may be mentioned.

In the foregoing, zirconium transition metal compounds were exemplified, but corresponding hafnium and titanium transition metal compounds may also suitably be used. Further, a mixture of the racemic-form and the meso-form may also be employed. Preferably, however, the racemic-form or the pseudo racemic-form is employed. In such a case, D-isomers or L-isomers may be employed.

For the production of the aromatic vinyl compound/olefin random copolymer to be used in the present invention, as the co-catalyst, a co-catalyst which has been used in combination with a transition metal compound, may be employed. As such a co-catalyst, aluminoxane (or alumoxane) or a boron compound is preferably employed.

As the co-catalyst, aluminoxane (or alumoxane) is particularly preferably employed.

A boron compound and an organic aluminum compound may be used simultaneously.

As the aluminoxane, methylalumoxane, ethylalumoxane or triisobutylalumoxane, is preferably employed.

Particularly preferred is methylalumoxane. If necessary, a mixture of these different types of alumoxanes, may be employed. Further, such an alumoxane may be used in combination with an alkylaluminum such as trimethyl aluminum, triethyl aluminum or tri-isobutyl aluminum, or with a halogen-containing alkylaluminum such as dimethylaluminum chloride.

Addition of an alkylaluminum is effective for removing substances which hinder polymerization, such as a polymerization inhibitor in the styrene monomer, or moisture in the solvent, or for removing adverse effects against the polymerization reaction.

When a boron compound is used as a co-catalyst, addition of an alkylaluminum compound such as tri-isobutyl aluminum is effective for the removal of impurities which adversely affect the polymerization, such as water contained in the polymerization system.

For the production of the aromatic vinyl compound/olefin random copolymer to be used in the present invention, the above-mentioned olefin, the aromatic vinyl compound, the transition metal compound catalyst and the co-catalyst are contacted. As to the manner and order for contacting, an optional known method may be employed.

The polymerization temperature is suitably from −78° C. to 200° C., preferably from 0° C. to 165° C. A polymerization temperature lower than −78° C. is industrially disadvantageous, and if it exceeds 200° C., decomposition of the transition metal compound catalyst will take place, such being undesirable. Industrially further preferred is from 30° C. to 160° C.

The amount of the transition metal compound to be used is preferably such that the molar ratio of double bonds of the total charged monomer to transition metal atoms in the transition metal compound, i.e. the molar ratio of double bonds of the total charged monomer/transition metal atoms, is preferably from 1 to $10^8$, more preferably from $10^2$ to $10^8$.

The details of the random copolymer of the present invention as described in the foregoing, are disclosed in JP-A-9-309925 and DE-19711339A1 by the present inventors, with respect to the transition metal compound catalyst, the co-catalyst and the structural characteristics, to be used for the production. However, the preferred ranges of the m and ms values are as disclosed in the present specification.

The α-olefin type polymer (B) constituting the resin composition of the present invention, is a homopolymer made of a $C_{2-12}$ α-olefin monomer such as ethylene, propylene, butene, 1-hexene, 4-methyl-1-pentene or 1-octene, or a copolymer made of two or more such monomers. If required, a diene such as butadiene or α, ω-diene may be copolymerized. Namely, it may, for example, be a high density polyethylene (HDPE), a low density polyethylene (LDPE), a linear low density polyethylene (LLDPE) such as an ethylene/1-octene copolymer, an isotactic polypropylene, a syndiotactic polypropylene, a propylene/ethylene random copolymer, a propylene/ethylene block copolymer, an ethylene/propylene copolymer (EPR), an ethylene/propylene/diene copolymer (EPDM) or a propylene/butene copolymer.

Further, a polymer of a cyclic olefin such as cyclopentene, norbornene or norbornadiene or an ethylene/norbornene copolymer which is a copolymer of the cyclic olefin with the above α-olefin, may also be employed.

The foregoing α-olefin type polymer (B) is required to have a weight average molecular weight as calculated as styrene, of at least 30,000, preferably at least 50,000, in order to provide the performance as a practical resin.

The aromatic vinyl compound type polymer (C) constituting the resin composition of the present invention includes a homopolymer of an aromatic vinyl compound and a copolymer of an aromatic vinyl compound with at least one monomer component copolymerizable therewith, wherein the aromatic vinyl compound content is at least 40 wt %.

Aromatic vinyl compound monomers to be used for the aromatic vinyl compound type polymer, may, for example, be styrene and various substituted styrenes such as p-methylstyrene, m-methylstyrene, o-methylstyrene, o-t-butylstyrene, m-t-butylstyrene, p-t-butylstyrene and α-methylstyrene. Further, a compound having a plurality of vinyl groups in one molecule, such as divinyl benzene, may also be mentioned. Further, a copolymer of a plurality of such aromatic vinyl compounds, may also be employed.

Further, the stereoregularity among aromatic groups of aromatic vinyl compounds may be atactic, isotactic or syndiotactic.

The monomer copolymerizable with the aromatic vinyl compound may, for example, be butadiene, isoprene or other conjugated dienes, acrylic acid, methacrylic acid, an amide derivative, an ester derivative or maleic anhydride. The copolymerization type may be a block copolymer or a random copolymer.

Further, it may be one having the above aromatic vinyl compound graft-polymerized to a polymer made of the above monomer, which contains at least 50 wt % of the aromatic vinyl compound. As such an example, a high impact polystyrene (HIPS) may, for example, be mentioned which includes a di- or tri-block copolymer such as a styrene/isoprene block copolymer (SIPS) or a styrene/butadiene block copolymer (SBS), or a hydrogenated block copolymer such as a hydrogenated styrene/butadiene/styrene block copolymer (SEBS) or a hydrogenated styrene/isoprene/styrene block copolymer (SEPS).

By employing, among them, a methacrylate/styrene copolymer, an acrylonitrile/styrene copolymer, a rubber-reinforced methacrylate/styrene copolymer, a rubber-reinforced acrylonitrile/styrene copolymer or a methacrylate/butylene/styrene copolymer, having a styrene content of at least 30 wt %, as the copolymer (C), more preferably by employing such a copolymer (C) having a refractive index of from 1.52 to 1.59, it is possible to obtain a resin composition of the present invention excellent in transparency, whereby the haze value in a thickness of 1 mm is not more than 50.

The foregoing aromatic vinyl compound type polymer (C) is required to have a weight average molecular weight as calculated as styrene, of at least 30,000, preferably at least 50,000, to provide the performance as a practical resin.

The resin composition of the present invention comprises from 5 to 95 wt % of the aromatic vinyl compound/olefin random copolymer (A) and from 5 to 95 wt % of the α-olefin type polymer (B) and/or the aromatic vinyl compound type polymer (C). The polymers (B) and (C) are incorporated alone or in combination in an amount of from 5 to 95 wt %. Preferred blending is such that when either one of (B) and (C) is employed, (A):(B)=10 to 90 wt %:90 to 10 wt %, or (A):(C)=10 to 90 wt %:90 to 10 wt %, and when both (B) and (C) are employed, (A):(B):(C)=5 to 50 wt %:5 to 90 wt %:5 to 90 wt %. In these ranges, particularly good effects can be obtained.

The component (A) to be used for the resin composition of the present invention may be a combination of plural members different in the styrene content ratio, the molecular weight and the molecular weight distribution. Further, also the components (B) and (C) may likewise be combinations of plural members.

To prepare the polymer composition of the present invention, a known suitable blending method may be employed. For example, melt-mixing can be carried out by means of e.g. a single screw or twin screw extruder, a Henschel mixer, a Banbury mixer, a plastomill, a co-kneader or a heat roll mill. Prior to the melt-mixing, it is advisable to mix various materials uniformly by means of e.g. a Henschel mixer, a ribbon blender, a super mixer or a tumbler. The melt-mixing temperature is not particularly limited, but it is usually from 100 to 300° C., preferably from 150 to 250° C. The resin composition of the present invention can be utilized as a product such as a sheet, a film, a blow-molded product, an injection-molded product or a heat press molded product.

A method for producing a sheet may, for example, be extrusion molding of e.g. T-die or inflation system, press molding or casting, and if necessary, stretching may be carried out. As a method for forming a foam, a physical method by means of a gas or a low boiling point hydrocarbon or a chemical method by means of an inorganic blowing agent, an organic blowing agent or a decomposition-type agent formed by a thermal decomposition of ammonia, water, nitrogen or carbon dioxide gas, may, for example, be mentioned. The inorganic blowing agent may, for example, be sodium hydrogencarbonate, ammonium carbonate or ammonium hydrogencarbonate. The organic blowing agent may, for example, be azodicarbonamide, azobisformamide or azobisisobutyronitrile.

Further, the obtained sheet or film may be subjected to secondary processing to obtain a container or a packaging material having excellent physical properties of the resin composition of the present invention.

The sheet is not particularly limited with respect to the thickness, a single layer, a multi layer or a layer structure. However, the thickness is preferably from 1 μm to 10 mm, particularly preferably from 5 μm to 3 mm. The container is also not limited with respect to the shape and the content.

The resin composition of the present invention exhibits excellent impact resistance, moldability, weather resistance or chemical resistance. This is believed to be attributable not only to the fact that the aromatic vinyl compound/olefin random copolymer (A) constituting the resin composition is per se excellent in the impact resistance, moldability, weather resistance or chemical resistance, but also to the fact that it has a head-to-tail chain structure of the aromatic vinyl compound in its molecule and effectively serves as a modifying agent or a compatibilizing agent for the α-olefin type polymer (B) and/or the aromatic vinyl compound type polymer (C), so that the random copolymer (A) and the α-olefin type polymer (B) and/or the aromatic vinyl compound type polymer (C) are supplemented to each other.

To the resin composition of the present invention, a known heat resistant stabilizer, weather resistant stabilizer, aging-preventing agent, anti-static agent, coloring agent, lubricant, softening agent, filler such as glass fiber, silica or talc, and a plasticizer may, for example, be incorporated as the case requires, within a range not to impair the performance of the resin composition.

Further, the resin composition of the present invention may be cross-linked by dynamic vulcanization in the presence of an organic peroxide, or under irradiation with electron rays or radiation rays.

The resin composition of the present invention can be used as a damping material which comprises from 5 to 99.5 wt % of such a resin composition and from 0.5 to 95 wt % of an inorganic filler, whereby the loss tangent tan δ of a dynamic viscoelasticity measured at a frequency of 1 Hz within a temperature range of from −100° C. to +100° C., is from 0.2 to 1.0. The ratio of the resin composition to the inorganic filler is preferably 10 to 99 wt %:1 to 90 wt %, more preferably 20 to 90 wt %:10 to 80 wt %. The range of the loss tangent tan δ is preferably from 0.5 to 8.0, more preferably from 1.0 to 6.0. Further, by using the aromatic vinyl compound/olefin random copolymers (A) to be used for the resin composition of the present invention, in a combination of plural members different in the styrene content ratio, the molecular weight, the molecular weight distribution, etc., it is also possible to obtain excellent damping properties within a wide temperature range.

Molded products made of the damping material of the present invention may be used for e.g. vibration-reducing parts for e.g. office appliances, household products such as washing machines, automobiles, machine tools, industrial machines or audio instruments such as speaker materials, for floor materials, for wall materials, or for sealing materials. In a case of a product having a flat surface structure such as a film, a sheet, a tile or a board, like a floor material, a wall material or a sealing material, it may be of a single layer structure or a multi layer structure. Products of other shapes may also have multi layer structures, as the case requires. In the case of a multi layer structure, it is possible to use in the respective layers the aromatic vinyl compound/olefin random copolymers (A) differing in the composition, the compositional distribution, the molecular weight, the molecular weight distribution, etc., the compositions of the present invention differing in the filler or the type or content of the flame retarder, other resin components, materials, etc. The aromatic vinyl/olefin random copolymers (A) are different in the peak temperatures of loss tangent (tan δ) depending upon the copolymerization ratios, and accordingly, by laminating a plurality of copolymers having mutually different copolymerization ratios, it is possible to obtain vibration-suppressing performance within a wide temperature range. In such a case, the copolymerization ratio is required to be different by at least 2%, preferably at least 5% by molar fraction.

Further, in the case of a multi layer structure, the number of layers is not particularly limited, but it is preferably from 2 to 10 layers, more preferably from 2 to 5 layers.

The resin composition of the present invention contains substantially no chlorine and is excellent in the impact resistance, moldability, weather resistance and chemical resistance, and it is useful for an injection molded product, an extrusion molded product, a film, a sheet, etc. Further, it provides an excellent damping material.

BRIEF DESCRIPTION OF THE DRAWINGS

FIG. 1 shows a tangent method to obtain a glass transition point.

BEST MODE FOR CARRYING OUT THE INVENTION

Now, the present invention will be further described with reference to Examples, but the present invention is by no means limited to the following Examples.

Firstly, the analytical methods for the styrene/ethylene random copolymers and the transition metal catalysts obtained in the after-mentioned respective Reference Examples and the methods for evaluation of the physical properties of the resin compositions in the Examples and Comparative Examples, will be described.

$^1$H-NMR spectra of transition metal catalysts and their precursors

① Instrument: α-500, manufactured by Nippon Denshi K.K.

② Solvent: $CDCl_3$

③ Standard sample: TMS $^{13}$C-NMR spectra of styrene/ethylene random copolymers and styrene/ethylene pseudorandom copolymers ① Instrument: α-500, manufactured by Nippon Denshi K.K.

② Solvent: 1,1,2,2-tetrachloroethane-d2

③ Standard sample: TMS

④ Method: Firstly, using TMS as standard, the shift value of the center peak of the triplet 13C-NMR peak of tetrachloroethane was determined, and then, the respective peak shift values of the copolymers were calculated using the triplet center peak of tetrachloroethane as standard.

The shift value of the triplet center peak of tetrachloroethane was 73.89 ppm.

The $^3$C-NMR spectrum measurement for quantitative analysis of peak areas, was carried out by a proton gate decoupling method having NOE (Nuclear Overhauser Effect) erased, by using pulses with a pulse width of 45° and a repeating time of 5 seconds as standard.

When the measurement was carried out under the same conditions except that the repeating time was changed to 1.5 seconds, the measured values of peak areas of the copolymer were confirmed to agree to the values obtained in the case where the repeating time was 5 seconds, within a measurement error range.

Styrene contents in styrene/ethylene random copolymers and styrene/ethylene pseudorandom copolymers ($^1$H-NMR method)

① Instrument: a-500, manufactured by Nippon Denshi K.K.

② Solvent: 1,1,2,2-tetrachloroethane-d2

③ Standard sample: TMS

④ Method: The determination was made by comparing the intensity of the peak (6.5 to 7.5 ppm) attributable to the proton of a phenyl group and the proton peak (0.8 to 3 ppm) attributable to an alkyl group.

Molecular weights of styrene/ethylene random copolymers and styrene/ethylene pseudorandom copolymers ① Instrument: Gel permeation chromatograph (GPC), HLC-8020, manufactured by TOSOH CORPORATION (However, a copolymer insoluble in THF at room temperature, was measured at 135° C. by means of GPC-7100, manufactured by Senshu Kagaku K.K.)

② Solvent: Tetrahydrofuran (THF) (However, for a copolymer insoluble in THF at room temperature, 1,2,4-trichlorobenzene was used.)

③ Standard sample: Standard polystyrene

④ Method: By GPC, it was obtained as the weight average molecular weight as calculated as standard polystyrene.

DSC measurement (differential scanning calorimetry) [the glass transition point and the melting point are shown as reference values.]

① Instrument: DSC 200, manufactured by Seiko Denshi K.K.

② Method: Measured in a nitrogen stream at a temperature raising rate of 10° C./min. As pretreatment, the temperature was raised from 40° C. to 250° C. at 20° C./min, followed by quenching, and the temperature was raised from −100° C. to 280° C. at 10° C./min. The glass transition point was determined in such a manner that tangent lines were drawn along linear portions before and after a portion where the gradient in the DSC chart changed substantially, and the glass transition point was obtained as the intersecting point thereof (tangent method shown in FIG. 1).

The physical properties of the resin compositions in the Examples were evaluated by the following methods.

Impact resistance: A ⅛ inch bar was molded, and a notch was imparted thereto. Then, it was determined at 23° C. in accordance with a hard plastic Izod impact testing method of JIS K-7110.

Flexural modulus: A ¼ inch bar was molded, and it was determined at 23° C. in accordance with a hard plastic flexural test method of JIS K-7203.

Tensile modulus, tensile elongation at break, tensile load at break: A sheet having a thickness of 1 mm was prepared by press molding (180° C./3 min) and punched out in a shape of No. 2 dumbbell. Using this dumbbell, they were obtained in accordance with the plastic tensile test method of JIS K-7113. The tensile rate was 2 mm/min for a resin composition having an elongation of not more than 400% and 100 mm/min for a resin composition having an elongation of at least 300%. However, for a high impact polystyrene, the test was carried at a tensile rate of 2 mm/min irrespective of the elongation.

Transparency: A sheet having a thickness of 1 mm was prepared by press molding (180° C./min), and the haze was obtained by a method in accordance with the plastic optical property test method of JIS K-7105 by means of a turbidity meter NDH-2000, manufactured by Nippon Denshoku K.K.

Surface hardness: Durometer hardness of type D was obtained in accordance with a plastic durometer hardness test method of JIS K-7215.

MFR: Measured in accordance with a thermoplastic flow test method of JIS K-7210. The test was carried out at a temperature of 200° C. under a load of 5 kgf.

Loss tangent tan δ: A sample for measurement (3 mm×40 mm) was cut out from a sheet having a thickness of 0.1 mm, prepared by hot pressing, and it was measured by means of a dynamic viscoelasticity measuring apparatus (RSA-II, manufactured by Rheometrix Company) at a frequency of 1 Hz within a temperature range of from −150° C. to +120° C. (the measuring temperature range was changed slightly depending upon the properties of the sample).

Evaluation of chemical resistance: A sheet was immersed in each reagent at room temperature for one day, whereupon visual inspection, tactile evaluation and weight measurement were carried out, and evaluations were carried out by the following standards:

⊚: No change, or a swelling degree of less than 10 wt %

○: Swelling degree of at least 10 wt % to less than 40 wt %

Δ: Swelling degree of at least 40 wt %

×: Dissolved

Now, as Reference Example 1, syntheses of styrene/ethylene random copolymers used in Examples, styrene/ethylene pseudorandom copolymers used in Comparative Examples and catalysts used in the preparation of the styrene/ethylene copolymers, will be described.

REFERENCE EXAMPLE 1

Preparation of Transition Metal Compound a

Rac-dimethylmethylenebis(4,5-benz-1-indenyl) zirconium dichloride (another name: rac-isopropylidenebis (4,5-benz-1-indenyl)zirconium dichloride, hereinafter referred to as rac{BInd-C(Me)$_2$-BInd}ZrCl$_2$) of the following formula was prepared by the following method.

4,5-Benzindene was prepared in accordance with a known method.

[a-1] Preparation of 1,1-isopropylidene-4,5-benzindene

Preparation of 1,1-isopropylidene-4,5-benzindene was carried out with reference to the preparation of 6,6-diphenylfulvene disclosed in Can, J. Chem. 62, 1751 (1984). However, as starting materials, acetone was used instead of benzphenone, and 4,5-benzindene was used instead of cyclopentadiene.

[a-2] Preparation of isopropylidenebis 4,5-benz-1-indene

In an Ar atmosphere, 21 mmol of 4,5-benzindene was dissolved in 70 ml of THF, and an equivalent amount of BuLi was added thereto at 0° C., followed by stirring for 3 hours. THF having 21 mmol of 1,1-isopropylidene-4,5-benzindene dissolved therein, was added thereto, followed by stirring at room temperature overnight. Then, 100 ml of water and 150 ml of diethyl ether were added thereto, followed by shaking, and the organic layer was separated and washed with a saturated sodium chloride aqueous solution and then dried over sodium sulfate. The solvent was distilled off under reduced pressure. The obtained yellow solid was washed with hexane and dried to obtain 3.6 g (yield: 46%) of isopropylidenebis 4,5-benz-1-indene.

From the $^1$H-NMR spectrum measurement, it was found to have peaks at 7.2–8.0 ppm (m,12H), 6.65 ppm (2H), 3.75 ppm (4H), and 1.84 ppm (6H).

The measurement was carried out using TMS as standard and CDCl$_3$ as a solvent.

[a-3] Preparation of rac-dimethylmethylenebis(4,5-benz-1-indenyl)zirconium dichloride In an Ar atmosphere, 7.6 mmol of isopropylidenebis 4,5-benz-1-indene and 7.2 mmol of zirconium tetrakisdimethylamide (another name: Zr(NMe$_2$)$_4$) were charged together with 50 ml of toluene, followed by stirring at 130° C. for 10 hours. Toluene was distilled off under reduced pressure, and 100 ml of methylene chloride was added thereto, and the mixture was cooled to −78° C. Then, 14.4 mmol of dimethylamine hydrochloride was slowly added thereto, and the temperature was slowly raised to room temperature, followed by stirring for 2 hours. After distilling off the solvent, the obtained solid was washed with pentane and then with a small amount of THF to obtain 0.84 g (yield: 21%) of rac-dimethylmethylenebis(4,5-benz-1-indenyl) zirconium dichloride of yellow orange color.

From the $^1$H-NMR spectrum measurement, it was found to have peaks at 8.01 ppm (m,2H), 7.75 ppm (m,2H), 7.69 ppm (d,2H), 7.48–7.58 ppm (m,4H), 7.38 ppm (d,2H), 7.19 ppm (d,2H), 6.26 ppm (d,2H) and 2.42 ppm (s,6H).

The measurement was carried out using TMS as standard and CDCl$_3$ as a solvent.

The elemental analysis was carried out by elemental analysis apparatus 1108 model (manufactured by Fysons Co., Italy), whereby the results being C63.86% and H3.98% were obtained. The theoretical values were C65.39% and H4.16%.

Preparation of Transition Metal Compound b

Rac-dimethylmethylene(1-indenyl)(4,5-benz-1-indenyl)zirconium dichloride (another name: rac-isopropylidene(1-indenyl)(4,5-benz-1-indenyl) zirconium dichloride, hereinafter referred to as rac{Ind-C(Me)$_2$-BInd}ZrCl$_2$) was prepared by the following method.

[b-1] Preparation of isopropylidene(1-indene)(4,5-benz-1-indene)

In an Ar atmosphere, 14 mmol of indene was dissolved in 50 ml of THF, and an equivalent amount of BuLi was added at 0° C., followed by stirring for 10 hours. Then, 10 ml of THF having 13 mmol of 1,1-isopropylidene-4,5-benzindene dissolved therein, was added thereto, followed by stirring at room temperature overnight. Then, 50 ml of water and 100 ml of diethyl ether were added, followed by shaking, and the organic layer was separated, washed with a saturated sodium chloride aqueous solution and dried over sodium sulfate. Then, the solvent was distilled off under reduced pressure. The residue was further purified by column chromatography to obtain 2.5 g (yield: 59%) of isopropylidene (1-indene)(4,5-benz-1-indene).

[b-2] Preparation of rac-dimethylmethylene(1-indenyl)(4,5-benz-1-indenyl)zirconium dichloride In an Ar atmosphere, 6.5 mmol of isopropylidene (1-indene)(4,5-benz-1-indene) and 6.5 mmol of zirconium tetrakisdimethylamide {another name: Zr(NMe$_2$)$_4$} were charged together with 40 ml of toluene, followed by stirring at 130° C. for 10 hours. Then, toluene was distilled off under reduced pressure, and 100 ml of methylene chloride was added thereto, and the mixture was cooled to −78° C. Then, 13 mmol of dimethylamine hydrochloride was slowly added thereto, and the temperature was slowly raised to room temperature, followed by stirring for 2 hours. Then, the solvent was distilled off, and the obtained solid was washed with pentane and then with a small amount of methylene chloride to obtain 0.76 g (yield 24%) of rac-dimethylmethylene(1-indenyl)(4,5-benz-1-indenyl) zirconium dichloride of orange color.

From the $^1$H-NMR spectrum measurement, it was found to have peaks at 7.05–8.04 ppm (m,10H) (provided a peak at 7.17 ppm is excluded), 7.17 ppm (d,H), 6.73 ppm (d,H), 6.25 ppm (d,H), 6.18 ppm (d,H), 2.41 ppm (m,3H), and 2.37 ppm (m,3H).

The measurement was carried out using TMS as standard and CDCl$_3$ as a solvent.

Preparation of Transition Metal Compound c

Rac-dimethylmethylene bis(3-cyclopenta[c]phenanthryl) zirconium dichloride (another name: rac{CpPhen-CMe$_2$-CpPhen}ZrCl$_2$) was prepared as follows. Here, CpPhen represents 3-cyclopenta[c]phenanthryl).

1H or 3H-cyclopenta[c]phenanthrene was prepared in accordance with a known method.

[c-1] Isopropylidene bis(cyclopenta[c]phenanthrene)

In an Ar atmosphere, 32 mmol of 1H or 3H-cyclopenta [c]phenanthrene was added to 40 ml of dimethoxyethane having 3.0 g of potassium hydroxide suspended thereto, and stirred at room temperature for 30 minutes. Then, 15 mmol acetone was added thereto, followed by stirring at 60° C. for 2 hours.

A 10% phosphoric acid aqueous solution was added for neutralization, followed by extraction with methylene chloride. The organic layer was washed with water and dried, and methylene chloride was distilled off. By recrystallization from a methylene chloride/diethyl ether solution, 1.5 g of isopropylidene bis(cyclopenta[c]phenanthrene) was obtained as white crystals.

From the $^1$H-NMR spectrum measurement, it was found to have peaks at 1.93 ppm (6H, s), 4.20 ppm (4H, d), 6.89 ppm (2H, t), 7.5–7.9 ppm (14H, m), 8.91 ppm (2H, d).

The measurement was carried out using TMS as standard and CDCl$_3$ as a solvent.

[c-2] Preparation of rac-dimethylmethylene bis(3-cyclopenta[c]phenanthryl) zirconium dichloride In an Ar stream, 2.0 mmol of isopropylidene bis (cyclopenta[c]phenanthrene) and 2.0 mmol of zirconium tetrakisdimethylamide, {Zr(Nme$_2$)$_4$} were charged together with 20 ml of toluene and stirred under reflux for 7 hours. Toluene was distilled off under reduced pressure, and 50 ml of methylene chloride was added, followed by cooling to −50° C. 4.0 mmol of dimethylamine hydrochloride was slowly added, and the temperature was slowly raised to room temperature, followed by stirring for further 2 hours. After distilling of the solvent, the obtained solid was washed with pentane and then with a small amount of methylene chloride to remove a meso form and a ligand to obtain 0.36 g of rac-dimethylmethylene bis(3-cyclopenta[c] phenanthryl) zirconium dichloride as yellowish orange crystals.

From the $^1$H-NMR spectrum measurement, it was found to have peaks at 2.55 ppm (6H, s), 6.49 ppm (2H, d), 7.55–8.02 ppm (16H, m), 8.82 ppm (2H, d).

The measurement was carried out using TMS as standard and CDCl$_3$ as a solvent.

Preparation of Transition Metal Compound d

With reference to JP-A-7-053168, a CGCT (constrained geometry catalyst) type Ti complex (tertiary butyl amide) dimethyl (tetramethyl-η5-cyclopentadienyl)silane titanium dichloride, another name: {CpMe$_4$—SiMe$_2$—NtBu}TiCl$_2$, was prepared.

Now, as Reference Example 2, preparation example for a styrene/ethylene (random) copolymer used in Examples of the present invention or Comparative Examples, will be described.

REFERENCE EXAMPLE 2

Preparation of Styrene/ethylene (random) Copolymer

Polymerization was carried out by means of a polymerization vessel having a capacity of 10 l or 150 l and equipped with a stirrer and a jacket for heating/cooling.

A dehydrated solvent (toluene or cyclohexane) and styrene were charged in the amounts as shown in Table 1 and heated and stirred at the polymerization temperature as shown in Table 1. Tri-isobutyl aluminum was added in the form of a hexane solution in an amount as shown in Table 1, and then methylalumoxane (MMAO-3A or PMAO-s) manufactured by TOSOH-AKZO K.K. was added in an amount as shown in Table 1. Ethylene was immediately introduced, and after the pressure was stabilized at a level shown in Table 1, from a catalyst tank installed above the polymerization vessel, a catalyst of the type and the amount as identified in Table 1, obtained by the above described Preparation Example, was dissolved in 100 ml of toluene having 2 mmol of tri-isobutyl aluminum dissolved therein, and the solution was added to the polymerization vessel. While maintaining the ethylene pressure at a level shown in Table 1, stirring was continued for a polymerization time as identified in Table 1 to complete the polymerization.

After completion of the polymerization, the obtained polymer solution was deaerated and then post-treated as follows to recover a copolymer.

① In the case of the 10 l polymerization vessel

The obtained polymer solution was gradually introduced into excess methanol which was vigorously stirred, to precipitate the formed polymer. The product was dried under reduced pressure at 60° C. until a weight change was no longer observed.

② In the case of the 150 l polymerization vessel

The obtained polymer solution was introduced over a period of 60 minutes into 150 l of heated water of 85° C. containing a dispersant and vigorously stirred. Thereafter, the temperature was raised to 97° C., followed by stirring for 60 minutes. Then, hot water containing the crumb was put into cool water to recover the crumb. The crumb was dried in air at 50° C. and then deaerated under vacuum at 60° C. to obtain a polymer having a good crumb shape and having a size of a few mm.

TABLE 1

| Polymer | | Catalyst type, amount ($\mu$mol) | Co-catalyst type, amount (mmol) | TIBA amount (mmol) | Solvent type, amount (ml) | Styrene amount (ml) | Ethylene pressure (MPa) | Polymerization temp. (° C.) | Polymerization time (hr) |
|---|---|---|---|---|---|---|---|---|---|
| p-1 | * | b  8.4 | m  84.0 | 8.4 | t  2400 | 2400 | 1.1 | 50 | 5 |
| p-2 | * | b  8.4 | m  84.0 | 8.4 | t   800 | 4000 | 0.2 | 50 | 6 |
| p-3 | * | a  2.1 | p  84.0 | 8.4 | t  4400 |  400 | 1.1 | 50 | 4 |
| p-4 | * | a  2.1 | m   8.4 | 8.4 | t  4000 |  800 | 1.1 | 50 | 8 |
| p-5 | * | a 21.0 | m  84.0 | 8.4 | t   800 | 4000 | 0.2 | 50 | 4 |
| p-6 |   | a 78.0 | m  840  | 84  | c 60000 |12000 | 1.0 | 50 | 3 |
| p-7 | * | a  2.1 | m   8.4 | 8.4 | t  4000 |  800 | 1.1 | 50 | 8 |
| p-8 |   | a 86.0 | m  840  | 84  | c 60000 |12000 | 1.0 | 50 | 2 |
| p-9 |   | a 76.0 | m  840  | 84  | c 64000 | 5000 | 1.0 | 50 | 2 |
| p-10|   | b 79.0 | m  840  | 84  | c 80000 | 5000 | 1.0 | 50 | 3 |
| p-11|   | a 83.0 | m  840  | 84  | c 54000 |18000 | 0.5 | 50 | 4 |
| p-12|   | c 118  | m  840  | 84  | c 36000 |36000 | 0.3 | 50 | 3 |
| p-13|   | d 329  | m  840  | 84  | c 54000 |18000 | 1.0 | 50 | 3 |
| p-14| * | d 21.0 | m  84.0 | 8.4 | c   800 | 4000 | 1.1 | 70 | 3 |
| p-15|   | a 84.0 | m  840  | 84  | c 54000 |18000 | 1.0 | 50 | 3 |
| p-16| * | b  8.4 | m   8.4 | 8.4 | t  4000 |  800 | 1.1 | 50 | 1 |

Notes:
symbol * indicates that the 10 l polymerization vessel was used, and no symbol indicates that the 150 l polymerization vessel was used.
Catalyst
a: Ind-CMe2-Bind.ZrCl2,
b: Bind-CMe2-Bind.ZrCl2,
c: CpPhen-CMe2-CpPhen.ZrCl2,
d: CpMe4-SiMe2-N(tBu).TiCl2,
Co-catalyst m: MMAO-3A, P: PMAO-S
Solvent t: Toluene, c: cyclohexane The analytical values of the obtained styrene/ethylene (random) copolymers p1–p16 are shown in Table 2.

When transition metal compounds a to c described in Reference Example 1 were used as catalysts, styrene random copolymers were obtained, and when transition metal compound d was used as the catalyst, a styrene/ethylene pseudorandom copolymer was obtained.

TABLE 2

| Polymer | Yield (g) | Styrene content (mol %) | Mw ($10^4$) | Tg (° C.) | Tm (° C.) | Styrene (h-to-t) chain | Value $\lambda$ | Value m | Value ms |
|---|---|---|---|---|---|---|---|---|---|
| p-1 | 870 | 32 | 30 | −6 | 83 | o | 25 | >.95 | >.80 |
| p-2 | 700 | 47 | 25 | 17 | — | o | 59 | >.95 | >.80 |
| p-3 | 500 |  7 | 54 | −25 | 75 | — | 3 | >.95 | — |
| p-4 | 870 | 16 | 12 | −24 | 55 | o | 8 | >.95 | — |
| p-5 | 1000 | 56 | 17 | 34 | — | o | 57 | >.95 | >.80 |
| p-6 | 13000 | 28 | 16 | −11 | 40 | o | 18 | >.95 | >.80 |
| p-7 | 870 | 16 | 12 | −24 | 55 | o | 8 | >.95 | — |

TABLE 2-continued

| Polymer | Yield (g) | Styrene content (mol %) | Mw (10⁴) | Tg (° C.) | Tm (° C.) | Styrene (h-to-t) chain | Value λ | Value m | Value ms |
|---|---|---|---|---|---|---|---|---|---|
| p-8 | 10600 | 25 | 17 | −16 | 100 | o | 19 | >.95 | >.80 |
| p-9 | 7600 | 15 | 12 | −27 | 65 | o | 9 | >.95 | — |
| p-10 | 5900 | 10 | 13 | −23 | 79 | — | 3 | >.95 | — |
| p-11 | 6800 | 39 | 35 | −15 | 75 | o | 48 | >.95 | >.80 |
| p-12 | 9000 | 54 | 23 | 0 | — | o | 53 | >.95 | >.80 |
| p-13 | 5100 | 17 | 25 | −30 | 57 | x | 7 | .5 | x |
| p-14 | 382 | 24 | 25 | −14 | 42 | x | 14 | .5 | x |
| p-15 | 10400 | 43 | 40 | 3 | 28 | o | 56 | >.95 | >.80 |
| p-16 | 924 | 19 | 34 | −24 | 77 | o | 10 | >.95 | — |

Tm: Symbol — represents no Tm.
Styrene (h-to-t) chain: Symbol o indicates that a peak is observed by 13C-NMR, symbol — indicates that the styrene content is so low that the determination can not be made, and symbol x indicates that no peak is observed by 13C-NMR.
Value ms: Symbol — indicates that the peak is so small that the calculation is impossible, and symbol x indicates that no peak is observed.

EXAMPLE (1) OF RESIN COMPOSITIONS

Styrene/ethylene copolymers p-1 to p-16 obtained by repeating the operation for production of styrene/ethylene (random) copolymers p-1 to p-16 described in Reference Example, were respectively formed into pellets by a tandem extruder (co-kneader PLK-46, manufactured by Büss Company) provided with a hot cut pelletizer, and the pellets were used in the following Examples and Comparative Examples. The operation conditions of the extruder were as follows.

First extruder: Cylinder temperature of 80° C., screw rotational speed of 120 rpm.

Second extruder: Cylinder temperature of 120° C., die temperature of 135° C., screw rotational speed of 22 rpm.

The following resins were used as the olefin type resin constituting the resin composition.

Polypropylene: Grand Polypro "F-103" (manufactured by Grand Polymer Company)

Random polypropylene: Grand Polypro "F-226D" (ditto)

HDPE: Chemilez "HD-1010" (manufactured by Maruzen Polymer K.K.)

Hydrogenated styrene/butadiene/styrene block copolymer: Kraton "G-1652" (manufactured by Shell Company)

Examples ①-1 to 14, and Comparative Examples ①-1 to 7

The styrene/ethylene random copolymers and various olefin type polymers were melt-kneaded at 230° C. by a 30 mmφ/twin screw extruder in the blend ratios as identified in Table 3. Evaluation of the physical properties of the obtained olefin type resin compositions was carried out, and the results are shown in Table 3. As Comparative Examples, using the hydrogenated styrene/butadiene/styrene block copolymer instead of the styrene/ethylene random copolymers, melt-kneading was carried out in the same manner as in Example ① in the blend ratios as identified in Table 3. Evaluation of the physical properties of the obtained resin compositions was carried out, and the results are shown in Table 3 on next pages. Further, the same evaluation was carried out with respect to Grand Polypro "F-103" alone, Grand Polypro "F-226D" alone and Chemilez "HD-1010" alone.

TABLE 3

| | | Examples | | | | | | | |
|---|---|---|---|---|---|---|---|---|---|
| | | ①-1 | ①-2 | ①-3 | ①-4 | ①-5 | ①-6 | ①-7 | ①-8 |
| Blend ratio | P-1 | | | | | 20 | | | |
| | P-2 | | | | | | 20 | | |
| | P-3 | | | | | | | 20 | |
| | P-4 | | | | | | | | 20 |
| | P-8 | 10 | | | | | | | |
| | P-10 | | 10 | | | | | | |
| | P-11 | | | 10 | | | | | |
| | P-12 | | | | 10 | | | | |
| | F-103 | 90 | 90 | 90 | 90 | 80 | 80 | 80 | 80 |
| Evaluation of physical properties | Flexural modulus (MPa) | 490 | 460 | 600 | 889 | 350 | 420 | 320 | 316 |
| | Tensile modulus (MPa) | 215 | 408 | 443 | 545 | 295 | 531 | 357 | 366 |
| | Tensile elongation at break (%) | 953 | 767 | 743 | 710 | 750 | 715 | 730 | 723 |
| | Tensile strength at break (MPa) | 42 | 34 | 32 | 25 | 37 | 23 | 29 | 35 |
| | Hardness (Shore D) | 67 | 64 | 61 | 69 | 62 | 63 | 61 | 65 |
| | MFR (g/10 min) | 6 | 12 | 14 | 7 | 5 | 5 | 5 | 5 |

TABLE 3-continued

|  |  | 85 | 65 | 87 | 32 | 225 | 206 | 274 | 265 |
|---|---|---|---|---|---|---|---|---|---|
|  | IZOD impact strength (J/m) |  |  |  |  |  |  |  |  |
|  | Solvent resistance (acetone) |  |  |  |  |  |  |  |  |
|  | Solvent resistance (hexane) |  |  |  |  |  |  |  |  |

|  |  | Examples | | Comparative Examples | | | |
|---|---|---|---|---|---|---|---|
|  |  | ①-9 | ①-10 | ①-1 | ②-2 | ①-3 | ①-4 |
| Blend ratio | P-5 | 20 |  |  |  |  |  |
|  | P-6 |  | 20 |  |  |  |  |
|  | P-13 |  |  |  |  | 10 | 20 |
|  | G-1652 |  |  |  | 10 |  |  |
|  | F-103 | 80 | 80 | 100 | 90 | 90 | 80 |
| Evaluation of physical properties | Flexural modulus (MPa) | 470 | 333 | 1372 | 465 | 487 | 313 |
|  | Tensile modulus (MPa) | 510 | 375 | 423 | 232 | 457 | 414 |
|  | Tensile elongation at break (%) | 715 | 693 | 943 | 890 | 810 | 577 |
|  | Tensile strength at break (MPa) | 21 | 34 | 40 | 41 | 36 | 36 |
|  | Hardness (Shore D) | 67 | 66 | 63 | 56 | 67 | 66 |
|  | MFR (g/10 min) | 5 | 5 | 6 | 5 | 5 | 4 |
|  | IZOD impact strength (J/m) | 274 | 245 | 25 | 73 | 65 | 378 |
|  | Solvent resistance (acetone) | ○ | ⊙ | ⊙ | ⊙ | ⊙ | ⊙ |
|  | Solvent resistance (hexane) | ⊙ | ⊙ | ⊙ | ⊙ | ⊙ | ⊙ |

|  |  | Examples | | | | Comparative Examples | | |
|---|---|---|---|---|---|---|---|---|
|  |  | ①-11 | ①-12 | ①-13 | ①-14 | ①-5 | ①-6 | ①-7 |
| Blend ratio | P-2 |  |  | 35 |  |  |  |  |
|  | P-8 | 10 |  |  | 10 |  |  |  |
|  | P-9 |  | 30 |  |  |  |  |  |
|  | G-1652 |  |  |  |  |  | 10 |  |
|  | F-226D | 90 | 70 | 65 |  | 100 | 90 |  |
|  | HD-1010 |  |  |  | 90 |  |  | 100 |
| Evaluation of physical properties | Flexural modulus (MPa) | 720 | 700 | 696 | 990 | 764 | 710 | 1100 |
|  | Tensile modulus (MPa) | 369 | 232 | 250 | 391 | 278 | 412 | 439 |
|  | Tensile elongation at break (%) | 800 | 613 | 490 | 1083 | 830 | 820 | 1203 |
|  | Tensile strength at break (MPa) | 30 | 22 | 33 | 40 | 31 | 27 | 43 |
|  | Hardness (Shore D) | 60 | 55 | 62 | 50 | 56 | 60 | 56 |
|  | MFR (g/10 min) | 14 | 10 | 13 | 3 | 15 | 12 | 3 |
|  | IZOD impact strength (J/m) | 137 | 142 | 314 | nb | 48 | 109 | nb |
|  | Solvent resistance (acetone) | ⊙ | ⊙ | ⊙ | ⊙ | ⊙ | ⊙ | ⊙ |
|  | Solvent resistance (hexane) | ⊙ | ⊙ | ⊙ | ⊙ | ⊙ | ⊙ | ⊙ | nb: not broken

As compared with polypropylene alone of Comparative Examples ①-1 and ①-5, Example ①-1 to 4 and ①-11 to 13 are superior in impact strength. Further, as compared with the composition having the hydrogenated styrene/butadiene/styrene block copolymer blended to the polypropylene of Comparative Example ①-6, Examples ①-11 to 13 were equal or superior in impact strength.

EXAMPLE (2) OF RESIN COMPOSITIONS

In the following Examples and Comparative Examples, the following resins were employed as the aromatic vinyl compound type resins constituting the resin compositions.

Polystyrene: Denka Styrol MW-1 (manufactured by Denki Kagaku Kogyo K.K.)

HIPS (high impact polystyrene): Denka Styrol HI-SQ (manufactured by Denki Kagaku Kogyo K.K.)

Examples ②-1 to 7 and Comparative Examples ②-1 to 3

Styrene/ethylene random copolymers and various aromatic vinyl compound type polymers were melt-kneaded in the same manner as in Example ① to obtain resin compositions. Evaluation of the physical properties of the obtained aromatic vinyl compound type resin compositions was carried out, and the results are shown in Table 4. As Comparative Examples, using the styrene/ethylene pseudorandom copolymer instead of the styrene/ethylene random copolymers, melt-kneading was carried out in the same manner as in Example ② in the blend ratios as identified in Table 4. Evaluation of the physical properties of the obtained resin compositions was carried out, and the results are shown in Table 4. Further, the same evaluation was carried out with respect to Denka Styrol HI-SQ alone and Denka Styrol MW-1 alone.

Table 4 is presented on next pages.

TABLE 4

|  |  | Examples | | | | | | |
|---|---|---|---|---|---|---|---|---|
|  |  | ②-1 | ②-2 | ②-3 | ②-4 | ②-5 | ②-6 | ②-7 |
| Blend ratio | P-1 | 30 | | | | | | |
|  | P-2 | | 30 | | | | | |
|  | P-3 | | | 30 | | | | |
|  | P-4 | | | | 30 | | | 35 |
|  | P-5 | | | | | 30 | | |
|  | P-6 | | | | | | 30 | |
|  | HI-SQ | 70 | 70 | 70 | 70 | 70 | 70 | |
|  | MW-1 | | | | | | | 65 |
| Evaluation of physical properties | Flexural modulus (MPa) | 1637 | 1676 | 1548 | 1568 | 1764 | 1597 | 1862 |
|  | Tensile modulus (MPa) | 330 | 320 | 350 | 345 | 360 | 343 | 1000 |
|  | Tensile elongation at break (%) | 160 | 120 | 150 | 140 | 100 | 153 | 25 |
|  | Tensile strength at break (MPa) | 15 | 17 | 16 | 16 | 17 | 17 | 25 |
|  | Hardness properties (Shore D) | 64 | 66 | 66 | 66 | 67 | 66 | 65 |
|  | MFR (g/10 min) | 6 | 6 | 5 | 5 | 5 | 6 | 8 |
|  | IZOD impact strength (J/m) | 235 | 216 | 206 | 236 | 196 | 280 | 147 |
|  | Solvent resistance (acetone) | Δ | Δ | Δ | Δ | Δ | Δ | — |
|  | Solvent resistance (hexane) | ○ | Δ | ○ | ○ | Δ | ○ | — |

|  |  | Comparative Examples | | |
|---|---|---|---|---|
|  |  | ②-1 | ②-2 | ②-3 |
| Blend ratio | P-13 | | 30 | |
|  | HI-SQ | 100 | 70 | |
|  | MW-1 | | | 100 |
| Evaluation of physical properties | Flexural modulus (MPa) | 1987 | 939 | 3234 |
|  | Tensile modulus (MPa) | 571 | 333 | 1100 |
|  | Tensile elongation at break (%) | 132 | 150 | 3 |
|  | Tensile strength at break (MPa) | 17 | 17 | 32 |
|  | Hardness (Shore D) | 72 | 65 | 74 |
|  | MFR (g/10 min) | 10 | 5 | 7 |
|  | IZOD impact strength (J/m) | 90 | 210 | 20 |
|  | Solvent resistance (acetone) | x | Δ | — |
|  | Solvent resistance (hexane) | Δ | Δ | — |

As compared with the polystyrene and the rubber-reinforced polystyrene alone in Comparative Examples ②-1 and 3, each Example is superior in impact strength. Further, the solvent resistance is improved. As compared with the composition having the styrene/ethylene pseudo-random copolymer blended to the rubber-reinforced polystyrene of Comparative Example ②-2, Examples ②-1 to 6 are superior in the flexural modulus and the chemical resistance and well-balanced.

Example of Transparent Resin Compositions

In the following Examples and Comparative Examples, the following styrene type resins were employed as transparent resins constituting the resin compositions. Styrene/methyl methacrylate copolymer: Denka TX polymer "TX-100" (manufactured by Denki Kagaku Kogyo K.K.)

Styrene/methyl methacrylate copolymer: Estylene "MS-200" (manufactured by Shin-Nittetsu Kagaku K.K.)

Rubber-reinforced styrene/methyl methacrylate copolymer: Denka TP polymer "TP-RX" (manufactured by Denki Kagaku Kogyo K.K.)

Acrylonitrile/styrene copolymer: Denka AS "AS-XGB" (manufactured by Denki Kagaku Kogyo K.K.)

Hydrogenated styrene/butadiene/styrene block copolymer: Kraton "G-1652" (manufactured by Shell Company)

Examples ③-1 to 7 and Comparative Examples ③-1 to 6

Styrene/ethylene (random) copolymers and the above transparent styrene type copolymer resins were melt-kneaded in the same manner as in Example ① to obtain transparent resin compositions. As Comparative Examples, using the styrene/ethylene pseudorandom copolymer and Kraton "G-1652" instead of the styrene/ethylene random copolymers, melt-kneading was carried out in the same manner as in Example ③ in the blend ratios as identified in Table 5. Further, the same operation was carried out also with respect to single use of Denka TX polymer "TX-100", etc. Evaluation of the physical properties of the obtained transparent resin compositions was carried out. The results are shown in Table 5.

TABLE 5

| | | Examples | | | | | | |
|---|---|---|---|---|---|---|---|---|
| | | ③-1 | ③-2 | ③-3 | ③-4 | ③-5 | ③-6 | ③-7 |
| Blend ratio | P-7 | | | 30 | | 30 | | |
| | P-8 | 10 | | | 10 | | | |
| | P-10 | | 30 | | | | | |
| | P-11 | | | | | | 30 | 30 |
| | TX-100 | 90 | 70 | 70 | | | | |
| | TP-RX | | | | 90 | 70 | | |
| | MS-200 | | | | | | 70 | |
| | AS-XGB | | | | | | | 70 |
| Evaluation of physical properties | Flexural modulus (MPa) | 3200 | 2000 | 2200 | 2000 | 1600 | 1500 | 3000 |
| | Tensile modulus (MPa) | 1043 | 586 | 727 | 726 | 375 | 602 | 794 |
| | Tensile elongation at break (%) | 26 | 14 | 13 | 50 | 23 | 85 | 16 |
| | Tensile strength at break (MPa) | 38 | 29 | 37 | 28 | 26 | 45 | 28 |
| | Haze (HAZE) (%) | 19 | 49 | 31 | 45 | 42 | 47 | 48 |
| | Hardness (Shore D) | 60 | 63 | 74 | 68 | 77 | 79 | 69 |
| | MFR (g/10 min) | 3 | 5 | 1 | 5 | 4 | 4 | 5 |
| | IZOD impact strength (J/m) | 16 | 23 | 25 | 49 | 110 | 21 | 43 |

| | | Comparative Examples | | | | | |
|---|---|---|---|---|---|---|---|
| | | ③-1 | ③-2 | ③-3 | ③-4 | ③-5 | ③-6 |
| Blend ratio | P-13 | | | 10 | | | |
| | G-1652 | | 10 | | | 10 | 30 |
| | TX-100 | 100 | 90 | 90 | | | |
| | TP-RX | | | | 100 | 90 | |
| | AS-XGB | | | | | | 70 |
| Evaluation of physical properties | Flexural modulus (MPa) | 3430 | 3020 | 2784 | 2250 | 2100 | 2900 |
| | Tensile modulus (MPa) | 1024 | 1007 | 818 | 1037 | 844 | 651 |
| | Tensile elongation at break (%) | 7 | 47 | 10 | 24 | 43 | 15 |
| | Tensile strength at break (MPa) | 53 | 45 | 52 | 39 | 31 | 32 |
| | Haze (HAZE) (%) | 4 | 91 | 80 | 8 | 91 | 81 |
| | Hardness (Shore D) | 76 | 70 | 73 | 72 | 70 | 62 |
| | MFR (g/10 min) | 2 | 3 | 2 | 6 | 5 | 6 |
| | IZOD impact strength (J/m) | 16 | 17 | 15 | 48 | 48 | 43 |

Each Example is excellent in transparency with the haze value being not more than 50% and is superior in the flexural modulus, tensile modulus and impact resistance as compared with the polymer alone of Comparative Examples ③-1 and 4.

Example as compatibilizing agents

In the following Examples and Comparative Examples, the following resins were employed as olefin type or styrene type resins constituting the resin compositions.

LDPE (low density polyethylene): Sumikathene "F-200" (manufactured by Sumitomo Chemical Company Limited)

Linear low density polyethylene: Ultzex "1520L" (manufactured by Mitsui Chemical Company Limited)

HDPE (high density polyethylene): Chemilez "HD-1010" (manufactured by Maruzen Polymer K.K.)

Propylene/ethylene block copolymer: Chisso Polypro "K-7730" manufactured by Chisso K.K.

Polystyrene: Denka Styrol "GP-1" (manufactured by Denki Kagaku Kogyo K.K.)

HIPS (high impact polystyrene): Denka Styrol "HI-U2" (manufactured by Denki Kagaku Kogyo K.K.)

Hydrogenated product of styrene/butadiene/styrene block copolymer: Kraton "G-1657" (manufactured by Shell Company)

Examples ④-1 to 6, and Comparative Examples ④-1 to 15

Styrene/ethylene random copolymers and the above resins were kneaded in the blend ratios as identified in Table 6 in a total amount of 45 g by a Brabender Plasti-Corder manufactured by Brabender Company at an external temperature of 180° C. at a rotational speed of 60 rpm for 10 minutes, to obtain resin compositions. Evaluation of the physical properties of the obtained resin compositions was carried out, and the results of the evaluation as compatibilizing agents are shown in Table 6. As Comparative Examples, using the styrene/ethylene pseudorandom copolymer and Kraton "G-1657" instead of the styrene/ethylene random copolymers, or without using the styrene/ethylene random copolymers, kneading was carried out under the same conditions as in Example ④ in the blend ratios as identified in Table 6, to obtain resin compositions. Evaluation of the physical properties of the obtained resin compositions was carried out. The results are shown in Table 6.

Further, sheets obtained by molding the resin compositions identified in Table 6 (B) were annealed at a temperature of 50° C. for 5 days and then, punched out into a shape of No. 2 dumbbell, and evaluation of the physical properties was carried out. The results are shown in Table 6 (B).

TABLE 6

|  |  | Examples |  |  |  |  |  |
|---|---|---|---|---|---|---|---|
|  |  | ④-1 | ④-2 | ④-3 | ④-4 | ④-5 | ④-6 |
| Blend ratio | P-8 | 10 | 10 | 10 | 10 | 10 | 10 |
|  | P-14 |  |  |  |  |  |  |
|  | G-1657 |  |  |  |  |  |  |
|  | GP-1 | 50 | 50 | 50 | 50 |  |  |
|  | HD-1010 |  |  | 40 |  |  | 40 |
|  | K-7730 |  |  |  | 40 |  |  |
|  | F-200 | 40 |  |  |  | 40 |  |
|  | 1520L |  | 40 |  |  |  |  |
|  | U-2 |  |  |  |  | 50 | 50 |
| Evaluation of physical properties | Tensile modulus (MPa) | 203 | 183 | 428 | 424 | 177 | 312 |
|  | Tensile elongation at break (%) | 49 | 89 | 33 | 12 | 72 | 46 |
|  | Tensile strength at break (MPa) | 12 | 11 | 20 | 15 | 10 | 18 |
|  | MFR (g/10 min) | 10 | 19 | 6 | 29 | 8 | 5 |

|  |  | Comparative Examples |  |  |  |  |  |  |  |  |
|---|---|---|---|---|---|---|---|---|---|---|
|  |  | ④-1 | ④-2 | ④-3 | ④-4 | ④-5 | ④-6 | ④-7 | ④-8 | ④-9 |
| Blend ratio | P-8 |  |  |  |  |  |  |  |  |  |
|  | P-14 |  | 10 |  | 10 |  | 10 |  |  |  |
|  | G-1657 | 10 |  | 10 |  | 10 |  |  |  |  |
|  | GP-1 | 50 | 50 | 56 | 50 | 50 | 56 | 50 | 50 | 56 |
|  | HD-1010 |  |  |  |  |  |  | 40 | 40 | 44 |
|  | K-7730 |  |  |  |  |  |  |  |  |  |
|  | F-200 | 40 | 40 | 44 |  |  |  |  |  |  |
|  | 1520L |  |  |  | 40 | 40 | 44 |  |  |  |
|  | U-2 |  |  |  |  |  |  |  |  |  |
| Evaluation of physical properties | Tensile modulus (MPa) | 81 | 180 | 374 | 100 | 190 | 308 | 220 | 335 | 492 |
|  | Tensile elongation at break (%) | 55 | 62 | 6 | 69 | 74 | 25 | 24 | 40 | 6 |
|  | Tensile strength at break (MPa) | 8 | 11 | 9 | 8 | 12 | 6 | 11 | 19 | 18 |
|  | MFR (g/10 min) | 16 | 7 | 16 | 13 | 6 | 8 | 10 | 4 | 6 |

TABLE 6-continued

|  |  | Comparative Examples | | | | | |
|---|---|---|---|---|---|---|---|
|  |  | ④-10 | ④-11 | ④-12 | ④-13 | ④-14 | ④-15 |
| Blend ratio | P-8 | | | | | | |
|  | P-14 | | | | | | |
|  | G-1657 | 10 | | 10 | | 10 | |
|  | GP-1 | 50 | 56 | | | | |
|  | HD-1010 | | | | | 40 | 44 |
|  | K-7730 | 40 | 44 | | | | |
|  | F-200 | | | 40 | 44 | | |
|  | 1520L | | | | | | |
|  | U-2 | | | 50 | 56 | 50 | 56 |
| Evaluation of physical properties | Tensile modulus (MPa) | 187 | 427 | 110 | 224 | 438 | 86 |
|  | Tensile elongation at break (%) | 20 | 5 | 50 | 24 | 8 | 37 |
|  | Tensile strength at break (MPa) | 5 | 12 | 8 | 6 | 15 | 12 |
|  | MFR (g/10 min) | 36 | 66 | 11 | 14 | 8 | 5 |

As compared with each Comparative Example wherein the resin composition of the present invention is not used as a compatibilizing agent, each Example is excellent in elongation and strength at break. Further, it is excellent in flowability as compared with the CGCT-incorporated system.

TABLE 6

|  |  | (B) | | | | | |
|---|---|---|---|---|---|---|---|
|  |  | Examples | | Comparative Examples | | | |
|  | Annealing | Before | After | Before | After | Before | After |
| Blend ratio | P-8 | 10 | | | | | |
|  | P-14 | | | | | 10 | |
|  | GP-1 | 50 | | 56 | | 50 | |
|  | HD-1010 | 40 | | 44 | | 40 | |
| Evaluation of physical properties | Tensile modulus (MPa) | 100 | 122 | 100 | 94 | 100 | 87 |
|  | Tensile strength at break (MPa) | 100 | 126 | 100 | 79 | 100 | 110 |

Note:
The numerical values are relative values based on the degree before annealing being 100.

As compared with Comparative Examples wherein the physical properties of the compositions having the styrene/ethylene pseudorandom copolymer incorporated, deteriorate by the heat treatment at 50° C., in each Example of the present invention, an increase of at least 20% is observed with respect to the elastic modulus and the strength at break.

Example as damping materials

Examples ⑤-1 to 4, and Comparative Examples ⑤-1 to 2

Using a Brabender Plasti-Corder (PLE-331 model) manufactured by Brabender Company, a styrene/ethylene random copolymer and calcium carbonate NS400N manufactured by Nitto Funka Kogyo K.K., or a styrene/ethylene random copolymer and polypropylene: Grand Polypro "F-103" (manufactured by Grand Polymer Company), were kneaded in the blend ratio as identified in Table 7 at an external temperature of 180° C. at a rotational speed of 60 rpm for 10 minutes to obtain a resin composition, and using a co-kneader (manufactured by Büss Company), a styrene/ethylene random copolymer and mica flake were fed in a ratio of 90:10 (weight ratio) to obtain a resin composition. The dynamic viscoelasticities of the obtained resin compositions were measured, and the loss tangent tan δ values and the temperatures thereof were examined. The chemical resistance and the tensile test properties were also evaluated. As Comparative Examples, using a styrene/isoprene/styrene block copolymer: Hivrar "VS-1" [styrene content: 20 wt %] (manufactured by Kuraray Corporation) and a hydrogenated product of styrene/isoprene/styrene block copolymer: Hivrar "HVS-3" (manufactured by Kuraray Corporation), evaluation was carried out in the same manner as in Example ⑤. The results are shown in Table 7 on next page.

TABLE 7

|  |  |  | Examples | | | | Comparative Examples | |
|---|---|---|---|---|---|---|---|---|
|  | Damping material |  | ⑤-1 | ⑤-2 | ⑤-3 | ⑤-4 | ⑤-1 | ⑤-2 |
| Blend ratio | Polymer | P-8 |  |  | 70 |  |  |  |
|  |  | P-11 |  |  |  | 90 |  |  |
|  |  | P-16 | 90 | 90 |  |  |  |  |
|  |  | F-103 | 10 | 10 | 30 | 10 |  |  |
|  |  | VS-1 |  |  |  |  | 100 |  |
|  |  | HVS-3 |  |  |  |  |  | 100 |
|  | Filler | Mica |  |  |  | 10 |  |  |
|  |  | NS400N | 33 | 100 | 5 |  |  |  |
| Evaluation of physical properties | Loss tangent | Peak temp. (° C.) | 32 | 32 | 0.6 | 21 | 16 | −7.0 |
|  |  | Peak value | 1.4 | 1.4 | 0.3 | 1.0 | 1.8 | 2.0 |
|  | Tensile properties | Tensile modulus (MPa) | 82.5 | 190 |  |  |  |  |
|  |  | Strength at break (MPa) | 18.3 | 17.2 | 20.8 | 25.3 | 5.1 | 8.2 |
|  |  | Elongation at break (MPa) | 420 | 390 | 760 | 250 | 580 | 900 |
|  | Chemical resistance | Against hexane | Δ | Δ | Δ | ○ | x | x |
|  |  | Against acetone | Δ | Δ | ○ | ○ | ○ | ○ |
|  | Compatibility | With polypropylene |  |  | ○ |  | x | ○ |

As is evident from Table 7, damping materials of Examples have a loss tangent tan δ as an index for the damping property at a temperature around normal temperature, and at the same time, they are excellent in mechanical properties, chemical resistance and compatibility with PP. Further, when an inorganic filler is incorporated, they are excellent in tensile modulus. Whereas, the copolymer of Comparative Example ⑤-1 is inferior in the chemical resistance and compatibility with polypropylene, and the copolymer (hydrogenated product) of Comparative Example ⑤-2 is inferior in chemical resistance. Further, Comparative Example ⑤-2 has a low peak temperature of loss tangent tan δ and thus has no practical usefulness as a damping material at a usual environment temperature.

Example as soft blend resin compositions

Examples ⑥-1 to 5, and Comparative Examples ⑥-1 to 3

Styrene/ethylene random copolymers in an amount of at least 70 wt % and various thermoplastic resins such as a methyl methacrylate/butadiene/styrene resin (MBS resin) "MBS64" (manufactured by Technopolymer Company), were melt-kneaded in the same manner as in Example 8 in the blend ratios as identified in Table 8, to obtain resin compositions (soft resin compositions). Evaluation of the physical properties of the obtained resin compositions was carried out, and the results are shown in Table 8. As Comparative Examples, using a hydrogenated product of styrene/butadiene/styrene block copolymer: Kraton "G-1650" and "G-1652" (manufactured by Shell Company) instead of the styrene/ethylene random copolymer, melt-kneading was carried out in the same manner as in Example ⑥ in the blend ratios as identified in Table 8, to obtain resin compositions. Evaluation of the physical properties of the obtained resin compositions was carried out, and the results are shown in Table 8.

TABLE 8

|  |  | Examples | | | | | Comparative Examples | | |
|---|---|---|---|---|---|---|---|---|---|
|  |  | ⑥-1 | ⑥-2 | ⑥-3 | ⑥-4 | ⑥-5 | ⑥-1 | ⑥-2 | ⑥-3 |
| Blend ratio | P-7 | 70 |  |  |  |  |  |  |  |
|  | P-8 |  | 70 |  | 70 | 70 |  |  |  |
|  | P-9 |  |  | 70 |  |  |  |  |  |
|  | G-1652 |  |  |  |  |  |  | 70 | 70 |
|  | G-1650 |  |  |  |  |  | 70 |  |  |
|  | F-103 | 30 | 30 |  |  | 30 |  |  |  |
|  | F-226D |  |  | 30 |  |  |  |  |  |
|  | TX-100 |  |  |  | 30 |  |  | 30 |  |
|  | MBS-64 |  |  |  |  | 30 |  |  | 30 |
| Evaluation of physical properties | Tensile modulus (MPa) | 98 | 24 | 68 | 16 | 10 | 232 | 23 | 93 |
|  | Tensile elongation at break (%) | 410 | 756 | 457 | 537 | 616 | 898 | 553 | 463 |
|  | Tensile strength at break (MPa) | 50 | 20 | 37 | 9 | 6 | 41 | 33 | 31 |
|  | Haze (HAZE) (%) |  |  |  | 49 | 29 |  | 83 | 82 |

TABLE 8-continued

|  |  | Examples | | | | | Comparative Examples | | |
| --- | --- | --- | --- | --- | --- | --- | --- | --- | --- |
|  |  | ⑥-1 | ⑥-2 | ⑥-3 | ⑥-4 | ⑥-5 | ⑥-1 | ⑥-2 | ⑥-3 |
| Hardness (Shore D) | | 32 | 30 | 27 | 27 | 24 | 56 | 30 | 46 |
| MFR (g/10 min) | | 8 | 10 | 7 | 10 | 6 | 5 | 1 | 1 |

As compared with Comparative Examples, each Example is superior in the resin flow (processability) and the haze value (transparency).

Example of films

Examples ⑦-1 to 4, and Comparative Examples ⑦-1 to 2

Using Laboplastomill (manufactured by Toyo Seiki K.K.) of extruder type (cylinder diameter: 20 mm, L/D=21), the compositions of Example ⑦ and Comparative Example ⑦ were formed into films under such conditions that the screw was a shallow flight forward end Dulmage type (CR=2.9), feed/compression/metering (full flight+double flight Dulmage)=7D/5D/9D, and the die was a coat hanger type (width: 150 mm, lip opening: 0.2 mm-t) to obtain films of 10 μm. The test results of the obtained films are shown in Table 9.

TABLE 9

|  |  | Examples | | | | Comparative Examples | |
| --- | --- | --- | --- | --- | --- | --- | --- |
|  |  | ⑦-1 | ⑦-2 | ⑦-3 | ⑦-4 | ⑦-1 | ⑦-2 |
| Blend ratio | P-7 |  |  |  | 30 |  |  |
|  | P-8 | 10 | 10 | 70 |  |  |  |
|  | G-1652 |  |  |  |  | 10 | 10 |
|  | F-103 | 90 |  |  |  | 90 |  |
|  | TX-100 |  | 90 | 30 | 70 |  | 90 |
| Evaluation of physical properties | Tensile modulus (MPa) | 629 | 1500 | 49 | 981 | 572 | 1517 |
|  | Tensile elongation at break (%) | 793 | 7 | 333 | 100 | 680 | 8 |
|  | Tensile strength at break (MPa) | 46 | 53 | 28 | 33 | 45 | 48 |

With respect to the tensile modulus, the tensile elongation at break and the tensile strength at break, the respective films of Examples ⑦-1 to 4 give good films comparable with those of Comparative Examples ⑦-1 to 2.

What is claimed is:

1. A resin composition comprising from 5 to 95 wt % of an aromatic vinyl compound/olefin random copolymer (A) which has an aromatic vinyl compound content of from 1 to 99 mol % and has a head-to-tail chain structure composed of two or more aromatic vinyl compound units, and from 95 to 5 wt % of at least one of an α-olefin polymer or copolymer (B) and an aromatic vinyl compound polymer or copolymer (C), wherein (B) and (C) are each different from (A).

2. The resin composition according to claim 1, characterized in that the aromatic vinyl/olefin random copolymer (A) is an aromatic vinyl/olefin random copolymer (A1) produced by means of a transition metal compound represented by the following formula K1 and a co-catalyst:

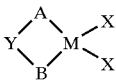

K1

(wherein A and B are groups selected from an unsubstituted or substituted cyclopentaphenanthryl group, an unsubstituted or substituted benzindenyl group, an unsubstituted or substituted cyclopentadienyl group, an unsubstituted or substituted indenyl group, or an unsubstituted or substituted fluorenyl group, provided that at least one of A and B is a group selected from an unsubstituted or substituted cyclopentaphenanthryl group, an unsubstituted or substituted benzindenyl group, or an unsubstituted or substituted indenyl group, and when each of A and B is an unsubstituted or substituted cyclopentaphenanthryl group, an unsubstituted or substituted benzindenyl group, or an unsubstituted or substituted indenyl group, the structures of the two may be the same or different;

Y is a methylene group, a silylene group or an ethylene group, which has bonds to A and B and further has hydrogen or a $C_{1-15}$ hydrocarbon group, provided that the substituents may be the same or different from one another, and Y may have a cyclic structure;

X is hydrogen, halogen, a $C_{1-15}$ alkyl group, a $C_{6-10}$ aryl group, a $C_{8-12}$ alkylaryl group, a silyl group having a $C_{1-4}$ hydrocarbon substituent, a $C_{1-10}$ alkoxy group, or a dialkylamide group having a $C_{1-6}$ alkyl substituent; and M is zirconium, hafnium or titanium).

3. The resin composition according to claim 1, characterized in that the aromatic vinyl compound/olefin random copolymer (A) is a styrene/ethylene random copolymer and is such a styrene/ethylene random copolymer (A2) wherein the alternating structure index λ of styrene units and ethylene units represented by the following formula (i) is larger than 1 and smaller than 70:

$$\lambda = A_3/A_2 \times 100 \quad (i)$$

where $A_3$ is the sum of peak areas attributable to three carbons a, b and c of a styrene/ethylene alternating structure represented by the following formula K2, as obtained by the $^{13}$C-NMR measurement, and $A_2$ is the sum of peak areas attributable to the main chain methylene and the main chain methine carbon, as observed within a range of from 0 to 50 ppm by $^{13}$C-NMR using TMS as standard:

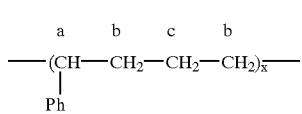

K2

(wherein Ph is a phenyl group, and x is an integer of at least 2 representing a number of repeating units).

4. The resin composition according to claim 3, characterized in that the styrene/ethylene random copolymer (A2) is such a styrene/ethylene random copolymer (A3) wherein the stereoregularity of phenyl groups in the styrene/ethylene alternating structure represented by the above formula K2 is larger than 0.5 as represented by an isotactic diad index m represented by the following formula (ii):

$$m = Am/(Ar+Am) \quad \text{(ii)}$$

where Ar is a peak area attributable to the r structure of methylene carbon appearing in the vicinity of 25 ppm by the $^{13}$C-NMR measurement, and Am is a peak area attributable to the m structure thereof.

5. The resin composition according to claim 3, characterized in that the styrene/ethylene random copolymer (A2) is such a styrene/ethylene random copolymer (A4) wherein the stereoregularity of phenyl groups in the chain structure of styrene units is larger than 0.5 as represented by an isotactic diad index ms represented by the following formula (iii):

$$ms = AM'/(Ar'+Am') \quad \text{(iii)}$$

where Ar' is a peak area of methylene carbon attributable to the syndiotactic diad structure (r structure) by the $^{13}$C-NMR measurement, and Am' is a peak area of methylene carbon attributable to the isotactic diad structure (m structure).

6. The resin composition according to claim 3, characterized in that the styrene/ethylene random copolymer (A2) is such a styrene/ethylene random copolymer (A5) having a chain structure of styrene units attributable to a peak appearing at from 40 to 41 ppm and/or from 42 to 44 ppm by the $^{13}$C-NMR measurement using TMS as standard.

7. The resin composition according to claim 2, characterized in that the aromatic vinyl/olefin random copolymer (A1) is a styrene/ethylene random copolymer (A6).

8. The resin composition according to claim 1 or 3, characterized in that the olefin type polymer (B) is at least one such an olefin type polymer (B1) selected from a polyethylene, a C3–C20 α-olefin homopolymer and a copolymer comprising ethylene and a C4–C20 diene.

9. The resin composition according to claim 1 or 3, characterized in that the aromatic vinyl compound polymer or copolymer (C) is at least one polymer or copolymer (C1) selected from a styrene resin and a rubber-reinforced styrene resin, containing at least 30 wt % of styrene units.

10. The resin composition according to claim 1, characterized in that the haze value measured in a thickness of 1 mm, is not higher than 50.

11. The resin composition according to claim 10, characterized in that the refractive index of the α-olefin polymer or copolymer (B) and/or the aromatic vinyl compound polymer or copolymer (C) measured at a temperature of 23° C., is from 1.52 to 1.59.

12. The resin composition according to claim 1, characterized in that the ⅛ inch Izod impact strength measured at a temperature of 23° C., is at least 50 J/m.

13. A molded product characterized in that it is made of the resin composition as defined in claim 1.

14. A foamed product characterized in that it is made of the resin composition as defined in claim 1.

15. A sheet characterized in that it is made of the resin composition as defined in claim 1.

16. A container characterized in that it is made of the resin composition as defined in claim 1.

17. A damping material characterized in that it comprises from 5 to 99.5 wt % of the resin composition as defined in claim 1 and from 0.5 to 95 wt % of an inorganic filler, and the loss tangent tan δ of a dynamic viscoelasticity measured at a frequency of 1 Hz within a temperature range of from −100° C. to +100° C., is from 0.2 to 10.

* * * * *